(12) United States Patent
Kato et al.

(10) Patent No.: US 7,585,576 B2
(45) Date of Patent: Sep. 8, 2009

(54) MAGNETIC RECORDING MEDIUM WITH DUAL MAGNETIC LAYERS INCLUDING SPECIFIC RESINS

(75) Inventors: Atsushi Kato, Miyagi (JP); Junji Kagawa, Miyagi (JP); Hiroyuki Murakami, Miyagi (JP); Fumiko Koike, Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/714,021

(22) Filed: Nov. 13, 2003

(65) Prior Publication Data
US 2004/0121187 A1 Jun. 24, 2004

(30) Foreign Application Priority Data
Dec. 19, 2002 (JP) ............... 2002-367893
Dec. 19, 2002 (JP) ............... 2002-367894

(51) Int. Cl.
G11B 5/702 (2006.01)
(52) U.S. Cl. ................. 428/839.2; 428/839.4
(58) Field of Classification Search .......... 428/839.4
See application file for complete search history.

(56) References Cited

U.S. PATENT DOCUMENTS

| | | | | |
|---|---|---|---|---|
| 5,470,645 A | * | 11/1995 | Oguchi et al. | 428/212 |
| 5,932,330 A | * | 8/1999 | Ohkubo et al. | 428/216 |
| 6,010,773 A | | 1/2000 | Murayama et al. | |
| 6,045,901 A | | 4/2000 | Hashimoto et al. | |
| 6,063,489 A | * | 5/2000 | Kobayashi et al. | 428/328 |
| 2003/0152806 A1 | * | 8/2003 | Murayama et al. | 428/694 BU |

FOREIGN PATENT DOCUMENTS

| | | |
|---|---|---|
| DE | 0 41 32 275 | 4/1992 |
| DE | 41 32 275 A1 | 4/1992 |
| EP | 0 373 856 | 6/1990 |
| EP | 0 373 856 A2 | 6/1990 |
| EP | 0 730 265 | 9/1996 |
| EP | 0 730 265 A2 | 9/1996 |
| JP | 61-214223 | 9/1986 |
| JP | 02-168417 | 6/1990 |
| JP | 02-192019 | 7/1990 |
| JP | 05-135354 | 6/1993 |
| JP | 05-274655 | 10/1993 |
| JP | 09-204639 | 8/1997 |
| JP | 10-149529 | 6/1998 |
| JP | 10-247315 | 9/1998 |
| JP | 2000-339664 | 12/2000 |

* cited by examiner

Primary Examiner—Kevin M. Bernatz
(74) Attorney, Agent, or Firm—Robert J. Depke; Rockey, Depke & Lyons, LLC

(57) ABSTRACT

A magnetic recording medium includes a non-magnetic supporter, a first magnetic layer and a second magnetic layer on which magnetic paints made of different ferromagnetic materials are applied in order of the first magnetic layer and the second magnetic layer on the non-magnetic supporter. Both the first magnetic layer and the second magnetic layer include polyester polyol having an alicyclic framework and a polyurethane resin composed of diisocyanate.

12 Claims, 1 Drawing Sheet

MAGNETIC RECORDING MEDIUM WITH DUAL MAGNETIC LAYERS INCLUDING SPECIFIC RESINS

The present document claims priority to Japanese Patent Application JP2002-367894, filed in the Japanese Patent Office Dec. 19, 2002; and Japanese Patent Application JP2002-367893, filed in the Japanese Patent Office Dec. 19, 2002, the entire contents of which are incorporated herein by reference.

BACKGROUND OF THE INVENTION

1. Field of the Invention

The present invention relates to a magnetic recording medium capable of recording both an analog signal and a digital signal.

2. Description of the Related Art

In recent television broadcasting or the like, a digital broadcasting or data broadcasting has been familiar to people. As magnetic recording media for audio and video, goods that meet a digitization have been mainly progressively utilized.

Since an analog record has been currently shifted to a digital record, if both an old analog record and a new digital record can be reproduced and edited by the same VTR or the drive, maneuverability thereof will be improved. Thus, a set of a VTR and a drive which can be used in multiple ways appears on the scene.

As disclosed in below-described Patent documents, in recent digital VTRs for a broadcasting station and a business or drives for data or the like, formats for simultaneously recording time codes as time signals or analog audio signals as well as digital signals are mainly utilized.

[Patent Document 1] Japanese Patent No. 3302397
[Patent Document 2] Japanese Patent Laid-Open Publication No. Heisei 7(1995)-201031
[Patent Document 3] Japanese Patent Laid-Open Publication No. Heisei 7(1995)-192251
[Patent Document 4] Japanese Patent Laid-Open Publication No. Heisei 7(1995)-235044

However, in the digital signals and the analog audio signals, it is difficult to satisfy respective characteristics at the same time due to the difference in their frequency or depth of record and various investigations have been carried out.

For instance, there is a technique that magnetic paint composed of magnetic powder of micro-particles meeting short wavelength suitable for a digital recording is applied to the thickness of 2 to 5 μm as the depth used for an analog recording.

However, this method has a problem of loss of thickness due to a self-demagnetization. For instance, an output is lowered in electromagnetic transfer characteristics because the thickness of a magnetic layer is large.

As a method for solving this problem, such a technique as described below is ordinarily used. That is, a non-magnetic thick layer is provided on the surface of a non-magnetic support member as a lower layer and a magnetic layer is formed on the non-magnetic layer as an upper layer, and the magnetic layer is thin to reduce thickness demagnetization and achieve a high output. However, since the lower layer is non-magnetic, this method is disadvantageous for the analog signal.

As compared with the above-described method, there is an Mag-on-Mag technique that a lower layer is made of a magnetic layer suitable for an analog recording and a magnetic layer suitable for a digital recording is applied thereon to satisfy both the layers. A multi-layered technique of the magnetic layers is characteristically designed to record an analog audio signal whose recording frequency is long as high as 1 KHz is recorded at the position of 2 to 3 μm in the direction of depth of a magnetic recording medium, and, on the other hand, to record a band of several MHz to several ten MHz used for recording a video signal with a shorter wavelength within 0.3 μm of the surface layer of the magnetic recording medium.

That is, according to the above-described Mag-on-Mag technique, the recording frequency of an upper layer has a short wavelength. Therefore, the magnetic powder of microparticles is used for the upper layer and magnetic powder having such magnetic characteristics as to take an output even in a long wavelength area is used for a lower layer, and the two layers are laminated in two layers.

Various kinds of Mag-on-Mag methods have been hitherto studied and many formats that a video signal is overwritten on an audio signal in a VHS or the like have been studied. However, when the Mag-on-Mag technique is put into practical use, conditions such as sizes of magnetic members combined together in upper and lower layers, magnetic characteristics and the thickness of each layer or the like are strict due to the above-described problem of self-demagnetization.

Here, there is a problem in producing the magnetic recording medium. When two kinds of magnetic paints are applied in layers, fine stripes (streaks) may be formed on the surfaces of magnetic layers owing to the difference in viscosity characteristics, or an upper layer may not be possibly adequately formed on a lower layer or a discontinuous miss of application may be possibly produced due to the difference in wet characteristics between the upper layer and the lower layer, which frequently causes a serious problem. As described above, the combination of the upper layer and the lower layer poor in their compatibility deteriorates a roughness in the surfaces of the magnetic layers to deteriorate an output due to a spacing between a head and the magnetic recording medium. Accordingly, this combination constitutes a problem in practical use.

In order to solve these problems, in a method for simultaneously applying paint on two layers by a Wet-on-Wet technique, the viscosity difference between the upper layer and the lower layer is located within a prescribed range. As an example of this technique, the Patent Document 1 discloses a method for making the viscosity of the upper layer higher by 50 CPS or more than that of the lower layer. According to this method, the generation of stripes is suppressed, however, the generation of a miss of application is not frequently effectively prevented. On the other hand, a Wet-on-Dry system that paint is firstly applied and dried only on a lower layer, and then, paint is applied to an upper layer has been studied. However, either of these methods has not a satisfactory effect.

Further, in the application type magnetic recording medium having a plurality of magnetic layers, paint is easily peeled off depending on the combination of paints of the layers to be laminated. Thus, durability is deteriorated or the output and the C/N of a video is greatly changed due to the roughness of the surface of the magnetic layer of a surface layer. In order to solve these problems, for instance, a method (see Patent Document 1) for using a tertiary amine polyurethane resin as a lower magnetic layer or a method (see Patent Document 2) for using a polyacetal resin as an upper magnetic layer or the like is disclosed. Many investigations of the methods have been hitherto carried out. Further, a method (see Patent Document 3) for improving a durability and traveling characteristics by similarly using as an additive agent carbon black having average particle size located within a specific range is disclosed.

However, in the above-described VTR or the like for the broadcasting station, heads as many as 20 to 50 are mounted on a rotary drum to provide a compatibility for both formats of a conventional analog system and a digital system. Further, there exist VTRs having relative speeds different from those of heads depending on an NTSC system and a PAL system. Therefore, a request for the durability of a magnetic tape increasingly becomes severe.

SUMMARY OF THE INVENTION

Thus, an object of the present invention resides in that a technique for obtaining a magnetic recording medium capable of meeting both an analog signal and a digital signal is established, and a technique is provided for improving a durability and electromagnetic transfer characteristics in a magnetic recording medium in which both upper and lower layers are magnetic layers and the thickness of the upper layer has 0.2 μm or larger, different from a structure of paint films that an upper layer is a thin magnetic layer having the thickness of 0.2 μm or smaller and a lower layer is a non-magnetic layer, which is conventionally and currently investigated in many and various ways.

As described above, it is an object of the present invention to provide a magnetic recording medium that can record both a digital signal and an analog signal for a VTR for a broadcasting station and a business, and can improve electromagnetic transfer characteristics and durability. Further, it is another object of the present invention to provide a technique effectively employed for improving the productivity of the magnetic recording medium.

According to a first aspect of the present invention, there is provided a magnetic recording medium, comprising:
  a non-magnetic supporter;
  a first magnetic layer; and
  a second magnetic layer on which magnetic paints made of different ferromagnetic materials are applied in order of the first magnetic layer and the second magnetic layer on the non-magnetic supporter, wherein both the first magnetic layer and the second magnetic layer include polyester polyol having an alicyclic framework and a polyurethane resin composed of diisocyanate.

According to a second aspect of the present invention, there is provided a magnetic recording medium, comprising:
  magnetic recording layers of multiple layers in which a first magnetic layer and a second magnetic layer are applied in order on a non-magnetic supporter,
  wherein the first magnetic layer includes carbon black having an average particle size of 80 nm or smaller and an abrasive having Mohs scale of 6 or higher, and the second magnetic layer includes MT carbon black having an average particle size of 200 nm to 400 nm and an abrasive having Mohs scale of 6 or higher.

The other object(s) and feature(s) of the present invention will become understood from the following description with reference to the accompanying drawing(s).

DESCRIPTION OF THE PREFERRED EMBODIMENT

Figure 1:
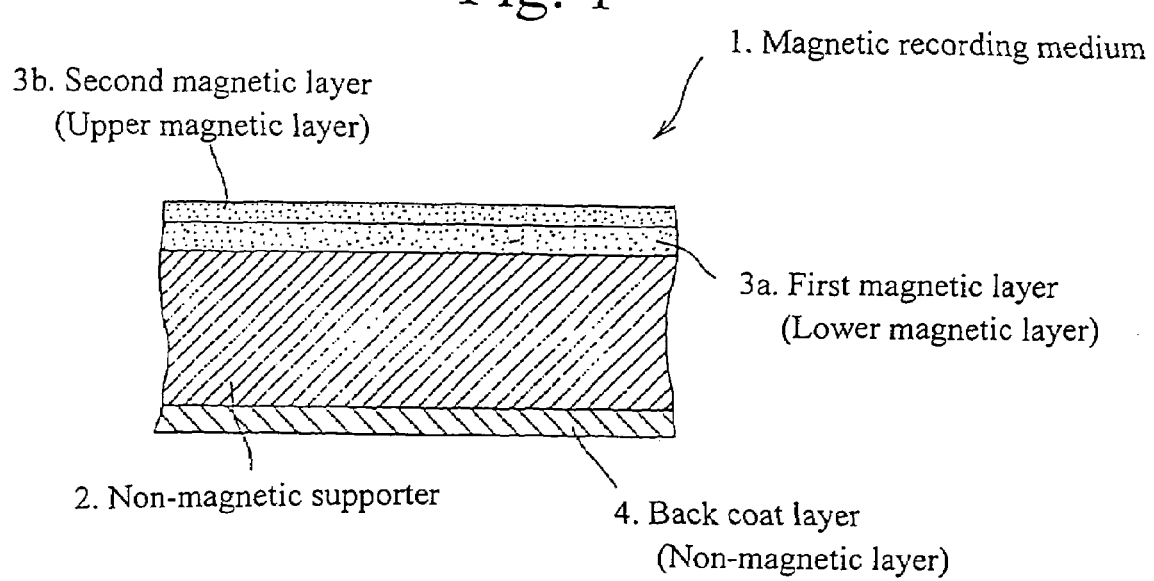
FIG. 1 is a schematic sectional view of a magnetic recording medium according an embodiment of the present invention.

Now, referring to the drawing, an embodiment of the present invention will be described below. As shown in a schematic sectional view of a magnetic recording medium according to the present invention, the magnetic recording medium 1 according to the present invention comprises a non-magnetic supporter 2, a first magnetic layer 3a made of magnetic powder (sometimes refer it to as a lower magnetic layer, hereinafter) and a second magnetic layer 3b (sometimes refer it to as an upper magnetic layer, hereinafter) which are applied and formed on the non-magnetic supporter 2 in order. Further, a back coat layer 4 (non-magnetic layer) may be provided on a surface opposite to the magnetic layer.

<Alicyclic Group-Containing Polyester Polyurethane Resin>

An alicyclic group-containing polyester polyurethane resin used in the present invention indicates a resin including polyester polyol having an alicyclic group typically represented by a cyclohexane ring and diisocyanate.

The generation of streaks on the paint applied on laminated layers or the deterioration of surface characteristics, which have been hitherto serious problems, have been investigated mainly from the viewpoints of the viscosity of paint, the difference in shearing stress due to application speed (difference in rheological characteristics), surface tension (wettability) or the like. The inventors of the present invention paid attention to a fact that there exists a closer relation between the concentration of urethane groups in the magnetic paint of the upper and lower layers and the generation of streaks or the deterioration of surface characteristics, so that they reached the present invention.

That is, the urethane group included in the polyurethane resin used as a binding agent of the magnetic recording medium is ordinarily high in its cohesive force in an organic solvent. Thus, when the urethane group is excessively included in the polyurethane resin, the viscosity of paint is undesirably raised or dispersion characteristics are deteriorated to degrade the application surface. Accordingly, the concentration of the urethane group apt to be cohere in the paint is controlled so that the generation of streaks when the paint is applied to the two layers at the same time by a die (Wet-on-Wet method) can be suppressed. The concentration of the urethane group in the polyurethane resin in the present invention is preferably located within a range of 0.5 mmol/g to 3.0 mmol/g.

As a method for controlling the concentration of the urethane group, since the cohesive force of the paint applied to the upper layer and the lower layer is the same, the same quantity of the polyurethane resin having the same concentration of the urethane group is effectively employed.

According to the present invention, both the above-described method and a method for controlling the cohesive force of the urethane group are employed depending on the framework of the polyurethane resin. Thus, the surface characteristics after the magnetic paint is applied to the upper and lower layers by the Wet-on-Wet method can be extremely improved in accordance with the synergistic effect thereof. The alicyclic group used in the present invention has a molecular structure that is three-dimensionally bulky and structurally rigid. Therefore, the framework of the alicyclic group is introduced to the polyurethane resin to block the cohesive force of the urethane group and raise a glass transition temperature (Tg) as an index of rigidity of the polyurethane resin. When Tg is raised, a function for improving the durability of the magnetic recording medium is also given. In the present invention, polyester polyol having the framework of the alicyclic group is used and polymerized with diisocyanate to obtain a polyurethane resin. The obtained polyurethane resin is employed.

<Material of Alicyclic Group-Containing Polyester Polyurethane Resin and Method for Producing it>

The polyurethane resin is a resin compound including an active hydrogen compound as materials and diisocyanate. The active hydrogen compound used in the present invention includes glycol having the framework of alicyclic group, polyester composed of dicarboxylic acid, and other glycol. Further, a polar group introducing source includes metal sulfonate-containing polyester, polyester including tertiary amine, or monomolecular glycol including tertiary amine.

As glycol components having the framework of the alicyclic group, for instance, cyclohexane dimethanol (CHDM) of cyclohexanediole (CHD), hydrogenated bisphenol A (H-BPA) or various kinds of substitution products thereof may be enumerated. These materials are dehydrated and condensed with dicarboxylic acid so that polyesters as the material of the polyurethane resin can be obtained. As the dicarboxylic acids, for instance, phthalic acid derivatives such as terephthalic acid (abbreviate it as TP, hereinafter), isophthalic acid (abbreviate it as IP, hereinafter), orthophthalic acid or the like, dicarboxylic acids such as succinic acid, adipic acid (abbreviate it as AA, hereinafter), sebacic acid, azelaic acid or the like, acid esters or acid anhydrides thereof, etc. may be employed.

Glycol components except the glycols having the framework of the alicyclic group, low molecular weight polyols, specifically, water, ethylene glycol (EG), 1,3-propylene glycol (PG), 1,2-PG, 1,4-butanediol (BG), 1,5-pentane glycol, 1,6-hexanediol (HG), 3-methyl-1,5-pentane glycol, neopentyl glycol, 1,8-octane glycol, 1,9-nonanediol, diethylene glycol, cyclohexane-1,4-diol, cyclohexane-1,4-dimethanol, dimer acid diol, TMP, glycerin, hexanetriol, quadrol, or ethylene oxide or propylene oxide adduct of bisphenol A or the like may be employed.

As diisocyanate compounds, for example, there may be exemplified diisocyanates including aromatic diisocyanates such as 2,4-toluene diisocyanate (abbreviate it as 2,4-TDI, hereinafter), 2,6-toluene diisocyanate (abbreviate it as 2,6-TDI, hereinafter), xylene-1,4-diisocyanate, xylene-1,3 diisocyanate, 4,4'-diphenyl methane diisocyanate (abbreviate it as MDI, hereinafter), 2,4'-diphenyl methane diisocyanate, 4,4'-diphenyl ether diisocyanate, 2-nitrodiphenyl-4,4'-diisocyanate, 2,2'-diphenyl propane-4,4'-diisocyanate, 3,3'-dimethyl diphenyl methane-4,4'-diisocyanate, 4,4'-diphenyl propane diisocyanate, m-phenylene diisocyanate, p-phenylene diisocyanate, naphthylene-1,4-diisocyanate, naphthylene-1,5-diisocyanate, 3,3'-dimethoxy diphenyl-4,4'-diisocyanate, etc., aliphatic diisocyanates such as tetramethylene diisocyanate, hexamethylene diisocyanate, lysine diisocyanate, etc., alicyclic diisocyanates such as isophorone diisocyanate, hydrogenated tolylene diisocyanate, hydrogenated xylene diisocyanate, hydrogenbated diphenyl methane diisocyanate, tetramethyl xylene diisocynate, etc.

As a method for introducing a polar group into a polyurethane resin, the polar group can be easily introduced as described. That is, the ester of tertiary amine or metal sulfonate-containing glycol is changed in polyester such as butylene adipate, or caprolactone or the like is added by several mols by several mols to the tertiary amine, the metal sulfonate-containing glycol or active hydrogens of amine to obtain a polymer component. Then, the obtained polymer component is used as a material to perform a urethane forming reaction.

Further, more generally, there is also a method for introducing a polar group into a polyurethane resin that a polar group-containing glycol compound, a polar group-containing amino alcohol compound or a polar group-containing diamine compound is used as a chain extending agent to directly introduce the polar group into the polyurethane resin under a urethane forming reaction.

As various kinds of tertiary amines used as polar group-containing active hydrogen compounds, aliphatic amines, aromatic amines, alkanol amine, alkoxy alkyl amine, etc. are exemplified. More specifically, N-methyl diethanol amine (NMDEA), N-methyl diisopropyl amine (NMDPA), diethylamino propanediol (DEAPD), N-(2-aminoethyl)ethanol amine, N-methyl ethanol amine, diisopropylamine, piperazine, 2-methyl piperazine(hydroxyethyl)piperazine, bis (amino propyl)piperazine, N-methyl aniline, N-methylphenyl amine, etc. are enumerated.

The quantity of the polar group of the tertiary amine in the present invention is 0.001 mmol/g to 1.0 mmol/g, and more preferably 0.01 mmol/g to 0.5 mmol/g. When the quantity of the polar group is larger than the above-described values, the dispersion characteristics of paint are improved, however, coating characteristics are deteriorated and streaks are apt to be generated. When the quantity of the polar group is smaller than the above-described values, the dispersion characteristics of the paint are deteriorated.

Alkali metal sulfonates include sodium sulfonate, potassium sulfonate, etc. An effective quantity of introducing the alkali metal sulfonate is 0.001 mmol/g to 1.0 mmol/g, and preferably 0.01 mmol/g to 0.4 mmol/g. When the quantity of the alkali metal sulfonate is smaller than the above-described values, an effective dispersion is not realized. When the quantity of alkali metal sulfonate is excessively larger than the above-described values, the viscosity of a resin becomes high, handling characteristics are deteriorated and the thixotropic characteristics of the paint are increased to deteriorate coating characteristics.

A method for synthesizing the polyurethane resin includes a solution synthesizing method in which an active hydrogen compound as a material of polyurethane is allowed to react with diisocyanate in an arbitrary organic solvent to obtain the polyurethane resin, and a solid synthesizing method in which materials are allowed to be directly mixed together and react with each other without using an organic solvent.

Specifically, in the solution synthesizing method, polyester polyol and water or an active hydrogen compound such as glycol having a molecular weight of 62 to 250 which serve as urethane materials are allowed to react with a diisocyanate compound in an organic solvent for dissolving these materials. Further, in the solid synthesizing method, the active hydrogen compound and the diisocyanate compound are mixed with each other in an extruder or a kneader or the like to directly react with each other so that a solid polyurethane resin is obtained.

The polyurethane resin in the present invention is obtained in such a manner that the component of the diisocyanate is allowed to react with the component of the active hydrogen compound of the above-described polyester or the like under the condition of an excessive active hydrogen in which the equivalent ratio of an active hydrogen group in the component of the active hydrogen compound relative to an isocyanate group of the component of the diisocyanate exceeds 1.0.

The condition of excessive active hydrogen is required for a produced polyurethane precursor to have no isocyanate group remaining and include an active hydrogen group. The equivalent ratio of the active hydrogen group in the component of the active hydrogen compound relative to the isocyanate group in the component of the diisocyanate is preferably 1.0 to 2.0. It is important to determine conditions that the polyurethane precursor does not gel upon production of the polyurethane precursor based on the average number of functional groups of the isocyanate group in including the component of polyisocyanate and the average number of functional groups of the component of the active hydrogen compound in introducing triol, and to mix the materials so as to satisfy the conditions. Here, the diisocyanate is allowed to react with the active hydrogen compound in such a mixing ratio as to consider the reactive ratio of reaction groups included in the active hydrogen compound and each molecules of the isocyanate. Thus, the polyurethane precursor can be produced without gelling.

The polyurethane component of the present invention can be produced in a molten state or a bulky state by uniformly mixing and making respective components react within a range of the mixing condition by the above-described solid synthesizing method.

As a reaction device, any device that can achieve the uniform reaction may be used. For instance, a reaction kiln having an agitator or a kneader, a mixing and kneading device such as a uni-axial or multi-axial extruding reactor, etc. may be exemplified. To accelerate a reaction, a metallic catalyst or amine catalyst that is usually employed as a catalyst in producing polyurethane may be used.

The polyurethane resin to be used has the average molecular weight of 5,000 to 50,000, preferably, the average molecular weight of 10,000 to 40,000, and more preferably, the average molecular weight of 15,000 to 30,000. When the average molecular weight is increased, the viscosity of the solution of the resin becomes high to deteriorate handling characteristics.

<Composition of Binding Agent of Upper Layer Paint and Lower Layer Paint>

As described above, since the concentrations of the urethane groups respectively included in the magnetic paints of the upper and lower layers are the same, the same quantity of the same polyurethane resin is desirably used for the upper and lower layers. In the present invention, the quantity of addition of the polyurethane resin is preferably 5 parts by weight to 20 parts by weight relative to the weight of magnetic powder. Especially when only the polyurethane resin of the present invention is employed as a binding agent, a magnetic recording medium having good characteristics can be obtained without using vinyl chloride copolymer as an environmental associated material.

As the binding agent to be combined with the alicyclic group-containing polyurethane resin, any of known materials may be used. Specifically, they may include vinyl chloride-vinyl acetate copolymer, vinyl chloride-vinyl acetate-vinyl alcohol copolymer, vinyl chloride-vinylidene chloride copolymer, vinyl chloride-acrylonitrile copolymer, vinyl chloride-vinyl acetate-maleic acid copolymer, acrylic ester-vinylidene chloride copolymer, acrylic ester-acrylonitrile copolymer, methacrylic acid-vinylidene chloride copolymer, methacrylic ester-styrene copolymer, thermoplastic polyurethane resin, phenoxy resin, polyvinyl fluoride, vinylidene chloride-acrylonitrile copolymer, butadiene-acrylonitrile copolymer, acrylonitrile-butadiene-methacrylic acid copolymer, polyvinyl butyral, cellulose derivative, styrene-butadiene copolymer, polyester resin, phenolic resin, epoxy resin, thermosetting polyurethane resin, urea resin, melamine resin, alkyd resin, urea-formaldehyde resin, polyvinyl acetal resin or mixtures of them, etc.

As ferromagnetic powder used in the present invention, well-known ferromagnetic materials such as γ-FeOx (x=1.33 to 1.5), Co modified γ-FeOx (x=1.33 to 1.5), a ferromagnetic alloy including Fe, Ni, or Co as a main component (75% or more), barium ferrite, strontium ferrite, etc. may be employed. In the above-described ferromagnetic powder, atoms such as Al, Si, S, Sc, Ti, V, Cr, Cu, Y, Mo, Rh, Pd, Ag, Sn, Sb, Te, Ba, Ni, Ta, W, Re, Au, Hg, Pb, Bi, La, Ce, P, Mn, Zn, Co, Sr, B, etc. may be included as well as prescribed atoms.

More useful magnetic powder in the present invention is ferromagnetic fine metal powder that shows an outstanding effect under conditions of saturation magnetization σs=100 Am$^2$/kg to 200 Am$^2$/kg, a specific surface area of 45 to 60 m$^2$/g by a BET method, and anti-magnetic force of 100 kA/m to 200 kA/m.

Here, different ferromagnetic fine powder is preferably used for the upper layer and the lower layer respectively. The upper layer uses the magnetic powder meeting a video signal and the lower layer uses the magnetic powder meeting an audio signal. As the particle size of metal powder used for the magnetic recording medium according to the present invention, an average major axis length is suitably 0.01 to 0.5 μm both for the upper and lower layers, and more preferably 0.4 to 0.2 μm. When the particle size of the metal powder is smaller than 0.01 μm, the metal powder has a super paramagnetism and its electromagnetic transfer characteristics are seriously deteriorated. When the particle size of the metal powder exceeds 0.4 μm, the metal particles have many magnetic domains to lower the electromagnetic transfer characteristics. Accordingly, to maintain the intended magnetic characteristics of the magnetic recording medium having a multiple structure, a needle shaped fine particle having an average major axis length of 0.01 to 0.4 μm is preferable. Here, as the particle size of the metal powder becomes small, the dispersion characteristics of magnetic paint are more deteriorated, and the recording wavelength on the lower layer is longer than that on the upper layer. Therefore, the particle size used in the lower layer is desirably larger than that used in the upper layer.

The specific surface area (BET) of the metal powder is suitably 25 to 70 m$^2$/g, and more preferably 40 to 60 m$^2$/g. When the specific surface area of the metal powder is smaller than 25 m$^2$/g, a compatibility with a resin upon formation of a tape is deteriorated to lower the electromagnetic transfer characteristics. Further, when the specific surface area of the metal powder exceeds 70 m$^2$/g, an imperfect dispersion is generated upon formation of a tape to likewise deteriorate the electromagnetic transfer characteristics.

The size of the crystallite of the metal magnetic powder is suitably 50 to 250 Å, and more preferably 100 to 200 Å. When the size of the crystallite of the metal magnetic powder is smaller than 50 Å, the magnetic powder has a super paramagnetism to seriously lower the electromagnetic transfer characteristics. When the size of the crystallite of the metal magnetic powder exceeds 250 Å, noise is increased to deteriorate the electromagnetic transfer characteristics.

The magnetic powder of the upper layer desirably includes Co in order to obtain a high output having video characteristics and ensure a weather resistance for enduring storage for a long time. When the content of Co is lower than 3 at. %, such operational effects may not be adequately obtained. Accordingly, the content of Co included in the magnetic powder of the upper layer ranges from 3 at. % to 50 at. %, more preferably ranges from 5 to 40 at. %, and further preferably ranges from 5 to 35 at. %. Here, at. % indicates the percentage of atoms.

As an element included in the metal magnetic powder, Al has a remarkable effect for improving the dispersion characteristics (sintering prevention property) of the needle shaped fine powder and holding the forms of particles upon reducing. When the content of Al is lower than 0.1 at. %, such an effect is hardly exhibited. When the content of Al is so large as to exceed 20 at. %, the above-described saturation magnetization σs is lowered and the magnetic characteristics are deteriorated. Accordingly, the content of Al is located within a range of 0.1 to 20 at. %, preferably within a range of 1 to 15 at. %, and more preferably within a range of 5 to 10 at. %. In this case, when Al is contained as a compound (oxide), the content does not refer to the quantity of the compound and refers to the content of the element Al in the compound.

Y (or other rare earth elements) is likewise included in the magnetic powder so that the dispersion characteristics of the paint are improved and the video output is more improved. Y effectively serves to prevent the metal powder from being sintered, and accordingly, improve the dispersion characteristics. When the content of Y in the magnetic powder is lower than 0.1 at. %, its effect is low so that the metal power is easily sintered. When the content of Y in the magnetic powder exceeds 10 at. %, the quantity of the oxide of the element is increased to decrease the saturation magnetization as, so that the magnetic powder is not proper as the magnetic metal powder for the second magnetic layer (upper layer). Further, the content of Y effective for improving the dispersion characteristics of the paint is located within a range of 0.5 to 5.0 at. %. As the rare earth elements, Y, La, Ce, Pr, Nd, Sm, Th, Dy, Gd, etc. may be exemplified. When these elements are compounded, the total quantity is set to 0.1 to 10 at. %. When these elements are contained as compounds, the content does not refer to the quantity of the compound and refers to the content of the elements respectively in the compounds.

As for other elements to be added to the magnetic powder for the upper layer and the lower layer, usually well-known elements may be used.

In the magnetic recording medium according to the present invention, any of conventionally known materials may be applied without limitation to a binding agent, an abrasive, an antistatic agent, a rust preventive including composition except that of the ferromagnetic magnetic powder mixed into the magnetic layers, solvents used for preparing magnetic paint, and non-magnetic supporters.

As materials of the non-magnetic supporters, materials ordinarily used for the magnetic recording medium can be employed. For instance, polyesters such as polyethylene terephthalate, polyethylene naphthalate, etc., polyolefines such as polyethylene, polypropylene, etc., cellulose derivatives such as cellulose triacetate, cellulose diacetate, cellulose acetate butylate, etc., vinyl resins such as polyvinyl chloride, polyvinylidene chloride, etc., polycarbonate, polyimide, polyamide imide, other plastics, metals such as aluminum, copper, etc., light alloys such as aluminum alloy, titanium alloy, etc., ceramics, single crystal silicon, etc. may be enumerated.

As carbon black employed for the magnetic recording medium according to the present invention, for instance, "Carbon Black Handbook" (edited by the carbon black association) can be referred to. Carbon is not limited specific kinds of carbon.

Further, in the carbon black used in the present invention, DBP oil absorption is located within a range of 30 to 150 ml/100 g and preferably located within a range of 50 to 150 ml/100 g. An average particle size is located within a range of 5 to 150 nm and preferably located within a range of 15 to 50 nm. A specific surface area by a BET method is effectively located within a range of 40 to 300 $m^2/g$ and preferably located within a range of 100 to 250 $m^2/g$. Further, a tap density is located within a range of 0.1 to 1 g/cc and pH is preferably located within a range of 2.0 to 10. The carbon black having a larger quantity of DBP oil absorption is high in its viscosity and is seriously poor in its dispersion characteristics. When the carbon black is low in its DBP oil absorption, the dispersion characteristics are low, so that a dispersion process takes much time. As the average particle size becomes smaller, the dispersion process requires more time, but surface characteristics are the more improved. As the particle size becomes larger, the surface characteristics become the worse. Therefore, the above-described range is preferable.

As the carbon blacks which satisfy the above-described conditions, for instance, a trade name RAVEN 1250 (particle size of 23 nm, BET value of 135.0 $m^2/g$, DBP oil absorption of 58.0 ml/100 g) produced by Colombian Carbon Corporation, RAVEN 1255 (particle size of 23 nm, BET value of 125.0 $m^2/g$, DBP oil absorption of 58.0 ml/100 g), RAVEN 1020 (particle size of 27 nm, BET value of 95.0 $m^2/g$, DBP oil absorption of 60.0 ml/100 g), RAVEN 1080 (particle size of 28 nm, BET value of 78.0 $m^2/g$, DBP oil absorption of 65.0 ml/100 g), RAVEN 1035, RAVEN 1040, RAVEN 1060, RAVEN 3300, RAVEN 450, RAVEN 780, etc., or a trade name SC (particle size of 20 nm, BET value of 220.0 $m^2/g$, DBP oil absorption of 115.0 ml/100 g) produced by CONDUCTEX Corporation may be used.

Further, a trade name #80 (particle size of 23 nm, BET value of 117.0 $m^2/g$, DBP oil absorption of 113.0 ml/100 g) produced by Asahi Carbon Co., Ltd., a trade name #22B (particle size of 40 nm, BET value of 5.0 $m^2/g$, DBP oil absorption of 131.0 ml/100 g) and #20B (particle size of 40 nm, BET value of 56.0 $m^2/g$, DBP oil absorption of 115.0 ml/100 g) produced by Mitsubishi Chemical Industries Ltd., a trade name BLACK PEARLS L (particle size of 24 nm, BET value of 250.0 $m^2/g$, DBP oil absorption of 60.0 ml/100 g) produced by Cabot Corporation, BLACK PEARLS 800 (particle size of 17.0 nm, BET value of 240.0 $m^2/g$, DBP oil absorption of 75.0 ml/100 g), BLACK PEARLS 1000, BLACK PEARLS 1100, BLACK PEARLS 700, BLACK PEARLS 905, etc. may be employed. Further, as carbon having a larger particle size, MT carbon (produced by Colombian Carbon Corporation, particle size of 350 nm), Thermax MT, etc. may be employed.

As the abrasives, for instance, x-alumina with α-formation rate of 90% or higher, β-alumina, γ-alumina, silicon carbide, chromium oxide, cerium oxide, α-iron oxide, corundum, silicon nitride, titanium carbide, titanium oxide, silicon dioxide, tin oxide, magnesium oxide, tungsten oxide, zirconium oxide, boron nitride, zinc oxide, calcium carbonate, calcium sulfate, barium sulfate, molybdenum disulfide, needle shaped α iron oxide obtained by dehydrating and annealing material of magnetic iron oxide or products obtained by performing a surface treatment on them as required by aluminum and/or silica, etc. are independently used or the combinations thereof are used.

The particle size of the non-magnetic powder is ordinarily located within a range of 0.01 to 2 μm, preferably located within a range of 0.015 to 1.00 μm and more preferably located within a range of 0.015 to 0.50 μm. Non-magnetic powder having different particle sizes may be combined together as required, or even single non-magnetic powder may have a particle size distribution widen to have the same effect. The tap density of the non-magnetic powder is ordinarily located within a range of 0.05 to 2 g/cc, and preferably located within a range of 0.2 to 1.5 g/cc. The specific surface area of the non-magnetic powder is ordinarily located within a range of 1 to 200 $m^2/g$, desirably located within a range of 5 to 100 $m^2/g$ and further desirably located within a range of 7 to 80 $m^2$ g. The size of the crystallite of the non-magnetic powder is ordinarily located within a range of 0.01 to 2 μm, preferably located within a range of 0.015 to 1.00 µm and further preferably located within a range of 0.015 to 0.50 µm. The oil absorption using DBP of the non-magnetic powder is ordinarily located within a range of 5 to 100 ml/100 g, desirably located within a range of 10 to 80 ml/100 g and further desirably located within a range of 20 to 60 ml/100 g. The specific gravity of the non-magnetic powder is ordinarily 1 to 12 and preferably 2 to 8. The form of the non-magnetic powder may be any of a needle shape, a spherical shape, a die shape, and a plate shape.

The non-magnetic is not necessarily completely pure and the surface thereof may be processed by other compound depending on its purpose. At this time, its purity may be 70% or higher so that an effect is not decreased. For instance, when titanium oxide is used, the surface is ordinarily treated by alumina. The ignition loss may be desirably 20% or lower. Mohs scale of the inorganic powder used in the present invention is desirably 6 or larger.

Further, as the abrasives, well-known abrasives including α-alumina, β-alumina, molten alumina, titanium oxide or the like as main components and having Mohs scale of 6 or higher are independently employed or the combinations thereof may be employed.

As the specific examples of the abrasives used in the present invention, there may be exemplified trade names UA 5600 and UA 5605 produced by Showa Denko K. K., trade names AKP-20, AKP-30, AKP-50, HIT-50, HIT-100 and ZA-GI produced by Sumitomo Chemical Co., Ltd., trade names G5, G7 and S-1 produced by Nippon Chemical Industrial Co., Ltd., trade names TF-100, TF-120, TF-140, DPN 250BX and DBN 270BX produced by Toda Kogyo Corporation, trade names TTO-51B, TTO-55A, TTO-55B, TTO-55C, TTO-55S, TTO-55D, FT-1000, FT-2000, FTL-100, FTL-200, M-1, S-1 and SN-100 produced by Ishihara Sangyo Kaisha Ltd., trade names ECT-52, STT-4D, STT-30D, STT-30 and STT-65C produced by Titan Kogyo K. K., a trade name T-1 produced by Mitsubishi Materials Corporation, trade names NS-O, NS-3Y and NS-8Y produced by Nippon Shokubai Co., Ltd., trade names MT-100S, MT-100T, MT-150W, MT-500B, MT-600B and MT-100F produced by Tayca Corporation, trade names FINE X-25, BF-1, BF-10, BF-20, BF-1L and BF-10P produced by Sakai Chemical Industry Co., Ltd., trade names DEFIC-Y and DEFIC-R produced by Dowa Mining Co., Ltd. and a trade name Y-LOP produced by Titan Kogyo K. K.

As a lubricant, any of usually known lubricants may be used. For instance, fluorine lubricants such as higher fatty acid esters, silicone oil, fatty acid modified silicon, fluorine-containing silicon, etc., amine lubricants such as polyolefine, polyglycol, alkyl phosphoric esters and metal salts, polyphenyl ethers, fluorinated alkylethers, alkyl carboxylic acid amine salts and fluorinated alkyl carboxylic acid amine salts, alcohols having the number of carbons of 12 to 24 (may respectively include unsaturated hydrocarbons or branch), higher fatty acids having the number of carbons of 12 to 24, etc. may be employed.

Further, as the components of the above-described higher fatty acid esters, higher fatty acid esters having the number of carbons of 12 to 32 (may respectively include unsaturated fatty acids or branch) may be used. For instance, methyl esters, ethyl esters, propyl esters, isopropyl esters, butyl esters, pentyl ester, hexyl esters, heptyl esters, octyl esters, etc. of lauric acid, myristic acid, palmitic acid, stearic acid, isostearic acid, arachic acid, oleic acid, eicosanoic acid, elaidic acid, behenic acid, linoleic acid, linolenic acid, etc. may be exemplified.

As the names of specific compounds, butyl stearate, pentyl stearate, heptyl stearate, octyl stearate, isooctyl stearate, butoxyethyl stearate, octyl myristate, isooctyl myristate, butyl palmitate, etc. may be exemplified. Further, as the lubricant, a plurality of lubricants may be mixed together.

As the antistatic agent, well-known antistatic agents such as a natural surface active agent, a nonion surface active agent, a cation surface active agent, etc. may be employed as well as the above-described carbon black.

In the present invention, a known coupling agent may be employed. As the coupling agent, a silane coupling agent, a titanate coupling agent, an aluminum coupling agent, etc. may be exemplified. Here, the quantity of the coupling agent to be added to the magnetic powder of 100 parts by weight is preferably located within a range of 0.05 to 10.00 parts by weight and more preferably located within a range of 0.1 to 5.00 parts by weight.

As the silane coupling agents, vinyl silane compounds such as γ-methacryloxypropyl trimethoxy silane, vinyltriethoxy silane, etc., epoxy silane compounds such as β-(3,4-epoxycyclohexyl)ethyltrimethoxy silane, γ-glycidoxypropyl trimethoxy silane, etc., amino silane compounds such as γ-aminopropyl triethoxy silane, N-β (aminoethyl) γ-aminopropyl methyldimethoxy silane, etc., mercapto silane compounds such as γ-mercaptopropyl trimethoxy silane, etc. may be preferably suitably used.

As the titanate coupling agents, tetra-n-butoxy titanium, tetraisopropoxy titanium, bis[2-[(2-aminoethyl)amino]ethanolate][2-[(2-aminoethyl)amino]ethanolate-0](2-propanolate)titanium, tris(isooctadecanoate-0)(2-propanolate) titanium, bis(ditridecyl phosphite-0")tetrakis(2-propanolate) dihydrogen titanate, bis (dioctyl phosphite-0")tetrakis(2-propanolate)dihydrogen titanate, tris (dioctyl phosphite-0") (2-propanolate)titanium, bis(dioctyl phosphite-0")[1,2 [ethanediolate (2-)-0,0']titanium, tris(dodecylbenzene sulfonate-0)(2-propanolate)titanium, tetrakis [2,2-bis [(2-propenyloxy)methyl]-1-butanolate titanate, etc. may be exemplified.

As specific trade names, for example, PLENACT KR TTS, KR 46B, KR 55, KR 41B, KR 38S, KR 138S, KR 238S, 338×, KR 12, KR 44, KR 9SA, KR 34S, etc. produced by Ajonomoto Co., Inc. may be preferably employed.

As the aluminum coupling agents, acetoalkoxy aluminum diisopropylate or the like may be exemplified. As a specific trade name, PLENACT AL-M or the like produced by Ajinomoto Co., Inc. may be preferably suitably used.

In the present invention, when the magnetic metal powder is employed, monomolecular carboxylic acid or multifunctional fruit acid is effectively added to reform a surface. As the multifunctional fruit acids, benzoic acid, phthalic acid, citric acid, malic acid, etc. may be exemplified and well-known acids may be used.

In the present invention, to provide a higher durability, an isocyanate curing agent having the average number of functional groups of 2 or more may be included. That is, polymeric materials of polyisocyanate or polyol adducts of polyisocyanate may be preferably suitably used in the present invention. Isocyanurate having a cyclic framework as the trimer of diisocyanate is a curing agent excellent in its reactivity and effective for improving the durability.

As the isocyanate curing agents, aromatic polyisocyanates and aliphatic polyisocyanates are exemplified. Adducts of active hydrogen compounds and them are preferable.

As the aromatic polyisocyanates, toluene diisocyanate (TDI), 1,3-xylene diisocyanate, 1,4-xylene diisocyanate, 4,4'-diphenyl methane diisocyanate (MDI), p-phenyl diisocyanate, m-phenyl diisocyanate, 1,5-naphthyl diisocyanate, etc. may be exemplified.

Further, as aliphatic polyisocyanates, hexamethylene diisocyanate (HDI), dicyclohexylmethane diisocyanate, cyclohexane diisocyanate, isophorone diisocyanate (IPDI), etc. may be exemplified.

As active hydrogen compounds forming adducts with the above-described materials, ethylene glycol, 1,4-butanediol, 1,3-butanediol, neopentyl glycol, diethylene glycol, trimethylol propane, glycerin, etc. may be exemplified. They preferably have an average molecular weight located within a range of 100 to 5000.

An amount of addition of the curing agent is generally located within a range of 0 to 20 parts by weight in the weight ratio of a binder resin, and preferably located within a range of 0 to 10 parts by weight. Herein, the weight of the curing-agent which is theoretically an amount of isocyanate equivalent to the active hydrogen in a polyurethane resin composition (or a binding agent resin composition) is adequately an amount of addition of the curing agent. However, in an actual production, isocyanate as the component of the curing agent reacts due to the existence of water or the like, so that the amount of isocyanate equivalent to that of the active hydrogen is frequently insufficient. Accordingly, the curing agent having an amount more excessive by 10% to 50% than the equivalent of the active hydrogen is effectively added.

When the isocyanate curing agent is used, a urethane group is produced due to the reaction of isocyanate with the active hydrogen in the binding agent. Thus, the weight of the curing agent to be added to the upper and the lower layer is desirably the same in the upper and lower layers like the above-described polyurethane resin.

Further, when the curing agent composed of polyisocyanate is used, after magnetic paint is coated, a curing reaction is accelerated for several hours at the temperature of 40° C. to 80° C. to obtain adhesive characteristics.

As solvents for preparing the magnetic paint, ketone solvents such as acetone, methyl ethyl ketone, methyl isobutyl ketone, cyclohexanone, etc., ester solvents such as methyl acetate, ethyl acetate, butyl acetate, ethyl lactate, ethyl acetate monoethyl ether, etc., glycol ether solvents such as glycol monoethyl ether, dioxane, etc., aromatic hydrocarbon solvents such as benzene, toluene, xylene, etc., chlorine-containing solvents such as methylene chloride, ethylene chloride, carbon tetrachloride, chloroform, ethylene chlorohydrin, dichlorobenzene, etc. may be enumerated. Further, other conventionally known organic solvents may be employed.

As methods for preparing the magnetic paint, any of well-known methods can be used. For example, a roll mill, a ball mill, a sand mill, a trommel, a high speed stone mill, a basket mill, a dispersion mill, a homo-mixer, a kneader, a continuous kneader, an extruder, a homogenizer and a ultrasonic dispersing machine, etc. may be used.

In the magnetic recording medium according to the present invention, a non-magnetic back coat layer may be provided on a surface of the non-magnetic supporter opposite to the magnetic layer. The thickness of the back coat layer may be located within a range of 0.3 to 1.0 μm and a well-known material may be used for the back coat layer.

In application of the magnetic paint, before the magnetic paint is directly applied to the non-magnetic supporter, an undercoat layer of an adhesive layer may be provided on the non-magnetic supporter or a pretreatment such as a corona discharge process or an electron beam irradiation process may be applied on the non-magnetic supporter.

As a method for applying the magnetic paint on the non-magnetic supporter, a simultaneous multi-layer application method by an extrusion coating (die coating) is more effective for the present invention. In the present invention, well-known methods can be used which include an air doctor coating, a blade coating, a rod coating, an extrusion coating, an air knife coating, a squeeze coating, an impregnation coating, a reverse roll coating, a gravure coating, a transfer roll coating, a cast coating, etc.

Here, for the purpose of improving an adhesive strength, the above-described layer (undercoat layer) including a well-known binding agent as a main component may be provided between the non-magnetic supporter and the first magnetic layer (lower layer).

EXAMPLES

Now, specific Examples of the present invention will be described below, however, the present invention is not limited to the Examples.

Example 1

<Manufacture of Magnetic Layers>

Each paint forming each magnetic layer was prepared on the basis of a below-described composition.

| <Production of paint of upper magnetic layer> | |
|---|---|
| magnetic metal powder: | 100 parts by weight |
| average length of major axis: | 0.15 μm |
| specific surface area: | 60 m²/g by BET method |
| particle size of crystal: | 150 Å |
| coercive force Hc: | 130 (kA/m) |
| saturation magnetization σs: | 130 (Am²/kg) |
| vinyl chloride copolymer: | variable |
| (the detail is described in Tables 2 to 4) | |
| polyester polyurethane resin: | variable |
| (the detail is described in Table 1) | |
| α-Al₂O₃: | 5 parts by weight |
| (produced by Sumitomo Chemical Co., Ltd., trade name: HIT-50) | |
| carbon black: | 1 parts by weight |
| (produced by Cabot Corporation, trade name: BP-L) | |
| citric anhydride: | 3 parts by weight |
| polyisocyanate: | 4 parts by weight |
| (produced by Nippon Polyurethane Industry Co., Ltd., trade name: Coronate L, in this case, polyisocyanate was mixed immediately before application.) | |
| myristic acid: | 1 parts by weight |
| butyl stearate: | 1 parts by weight |
| methyl ethyl ketone: | 80 parts by weight |
| methyl isobutyl ketone: | 80 parts by weight |
| toluene: | 80 parts by weight |

The magnetic paint of the upper layer having the above-described composition was kneaded by three rolls and then dispersed by using a sand mill. Then, polyisocyanate of 4 parts by weight and myristic acid of 1 parts by weight were added to the obtained magnetic paint. The obtained magnetic paint was filtered by a filter having an average aperture of 1 μm to obtain upper layer magnetic paint solution.

| <Production of paint of lower magnetic layer> | |
|---|---|
| magnetic metal powder: | 100 parts by weight |
| average length of major axis: | 0.25 μm |
| specific surface area: | 60 m²/g by BET method |
| particle size of crystal: | 200 Å |
| coercive force Hc: | 125 (kA/m) |
| saturation magnetization σs: | 110 (Am²/kg) |
| vinyl chloride copolymer: | variable |
| (the detail is described in Tables 2 to 4) | |

-continued

<Production of paint of lower magnetic layer>

| | |
|---|---|
| polyester polyurethane resin: (the detail is described in Table 1) | variable |
| α-Al$_2$O$_3$: (produced by Sumitomo Chemical Co., Ltd., trade name: HIT-50) | 5 parts by weight |
| carbon black: (produced by Cabot Corporation, trade name: BP-L) | 1 parts by weight |
| citric anhydride: | 3 parts by weight |
| polyisocyanate: (produced by Nippon Polyurethane Industry Co., Ltd., trade name: Coronate L, in this case, polyisocyanate was mixed immediately before application.) | 4 parts by weight |
| myristic acid: | 1 parts by weight |
| butyl stearate: | 1 parts by weight |
| methyl ethyl ketone: | 80 parts by weight |
| methyl isobutyl ketone: | 80 parts by weight |
| toluene: | 80 parts by weight |

The magnetic paint of the lower layer having the above-described composition was kneaded by a continuous kneader and then dispersed by using a sand mill. Then, polyisocyanate of 4 parts by weight and myristic acid of 1 parts by weight were added to the obtained magnetic paint. The obtained magnetic paint was filtered by a filter having an average aperture of 1 μm to obtain lower layer magnetic paint solution.

Further, back coat paint having a below-described composition was prepared.

<Production of non-magnetic paint for back coat>

| | |
|---|---|
| carbon black: (produced by Asahi Carbon Co., Ltd., #80 (particle size of 23 nm, BET value of 117.0 m$^2$/mg) | 100 parts by weight |
| carbon black: (produced by Engineered Carbons Inc., N990, average particle size of 350 nm) | 5 parts by weight |
| rutile type titanium oxide: (produced by Titan Kogyo K. K.; KR-310, particle size of 0.38 μm) | 3 parts by weight |
| polyurethane resin: (including polycarbonate polyol/neopentyl glycol HDI polyurethane, molecular weight of 35000, N-methyl diethanol amine of 0.2 wt %) | 25 parts by weight |
| nitrocellulose: (produced by Asahi Kasei Corporation, trade name: NC-1/2H) | 15 parts by weight |
| polyisocyanate: (produced by Nippon Polyurethane Industry Co., Ltd., trade name: Coronate L. In this case, polyisocyanate was mixed immediately before the application of paint.) | 20 parts by weight |
| methyl ethyl ketone: | 180 parts by weight |
| methyl isobutyl ketone: | 180 parts by weight |
| toluene: | 180 parts by weight |

The non-magnetic paint having the above-described composition was kneaded by three rolls and then dispersed by using a sand mill. Then, polyisocyanate of 20 parts by weight was added to the obtained non-magnetic paint. The obtained non-magnetic paint was filtered by a filter having an average aperture of 1 μm to obtain non-magnetic paint solution for the back coat.

The magnetic paint solutions prepared as described above were respectively applied to a polyethylene terephthalate film having the thickness of 10 μm so as to respectively have the thickness of 3.0 μm. Thus, the magnetic paints were applied to the two layers at the same time, dried, calendered and cured. Then, the non-magnetic paint for the back coat prepared as described above was applied to a surface opposite to the magnetic surface of the polyethylene terephthalate film so as to have the thickness of 0.8 μm, and dried. Then, the obtained wide magnetic film was cut to a film having ½ inch-width so that a video tape was formed. Further, the video tape was incorporated in a cassette for HDCAM produced by Sony Corporation. Then, cassette tapes of Examples 1 to 35 and Comparative Examples 1 to 29 were manufactured.

<Measurement Method>

(Measurement of Electromagnetic Transfer Characteristics)

For each of the above-described Samples incorporated in the HDCAM cassettes, an output of a digital video signal under 46.98 MHz and an analog audio signal under 1 kHz on an HDCAM video tape recorder (HDW-500) produced by SONY Corporation was measured. The value of Comparative Example 1 was represented as 0 dB. Further, C/N under +1.0 MHz was likewise measured and the C/N of Comparative Example 1 was represented as 0 dB.

In the measurement of the electromagnetic transfer characteristics, the samples having the outputs of −0.5 dB or lower may be decided to be inferior in their characteristics to the tape as a reference. The samples having the outputs of −2.0 dB or lower may be decided not to satisfy standards of various kinds of formats.

(Measurement of Surface Roughness)

A surface roughness was measured in accordance with JIS-B0601 under such conditions as described below. The Samples were measured by n=3 and the center line average height (SRa) was obtained.

| | |
|---|---|
| measuring device: | ET-30HK |
| maker: | Kosaka Laboratory Ltd. |
| measuring conditions: | |
| radius of curvature of contact end: | tracer method of 2 μm |
| measuring range: | 250 μm × 50 μm |
| magnification of height: | × 100,000 times |
| cut-off: | 80 μm |

(Measurement of Durability)

Recording and reproducing operations were carried out by an HDCAM video recorder (HDW-2000) produced by SONY Corporation for 100 hours to measure the waveforms of the outputs of video signals and evaluate them in accordance with the following standards.

○ shows that an output of a video signal is not deteriorated. Δ shows that an output is deteriorated, an output is recovered and an output is located within a range −2.0 dB. x shows that a head clog is generated.

The compositions of polyurethane resins used in the Examples and Comparative Examples are shown in Table 1. PU1 to PU13 are polyurethane resins used in the present invention and PU14 to PU23 are polyurethane resins used in the Comparative Examples.

Results are shown in the Tables 2 to 4.

TABLE 1

Polyurethane resins PU1 to Pu13 of Examples

|  | PU1 | PU2 | PU3 | PU4 | PU5 | PU6 | PU7 |
|---|---|---|---|---|---|---|---|
| Polyester | IP/TP CHD/NPG | IP/TP CHD/NPG | IP/TP CHD/NPG | IP/TP CHD/NPG | IP/TP CHD/NPG | IP/TP CHD/NPG | IP/TP CHD/NPG |
| Diisocyanate | MDI | MDI | MDI | MDI | MDI | MDI | MDI |
| Polar group | DEAPD | DEAPD | DEAPD | DEAPD | DEAPD | NMDEA | $SO_3Na$ |
| (mmol/g) | 0.05 | 0.1 | 0.2 | 0.5 | 0.7 | 0.2 | 0.2 |
| Molecular weight |  |  |  |  |  |  |  |
| Mn(× 1000) | 25,000 | 26,000 | 25,000 | 24,800 | 25,600 | 36,000 | 18,300 |
| Mw(× 1000) | 51,000 | 52,300 | 51,200 | 50,600 | 52,300 | 72,100 | 39,500 |

|  | PU8 | PU9 | PU10 | PU11 | PU12 | PU13 |
|---|---|---|---|---|---|---|
| Polyester | IP/TP CHD/NPG | IP/TP CHDM/NPG | IP/TP CHDM/DMH | IP/AA CHDM/BG | IP/AA H-BPA | IP/AA H-BPA/HG |
| Diisocyanate | MDI | MDI | MDI | TDI | TDI | HDI |
| Polar group | DEMPA | DEAPD | DEAPD | DEAPD | DEAPD | DEAPD |
| (mmol/g) | 0.05 | 0.2 | 0.2 | 0.2 | 0.2 | 0.2 |
| Molecular weight |  |  |  |  |  |  |
| Mn(× 1000) | 20,000 | 28,000 | 30,000 | 48,000 | 22,000 | 33,000 |
| Mw(× 1000) | 41,000 | 59,000 | 60,800 | 95,000 | 48,200 | 68,200 |

Polyurethan resins PU14 to PU23 of Comparative Examples

|  | PU14 | PU15 | PU16 | PU17 | PU18 |
|---|---|---|---|---|---|
| Polyester | IP/TP BG/NPG | IP/TP PG/HG | IP/TP EG/NPG | IP/AA DMH/NPG | IP/AA HG/Gy |
| Diisocyanate | MDI | MDI | MDI | MDI | MDI |
| Polar group | DEAPD | DEAPD | DEAPD | DEAPD | DEAPD |
| (mmol/g) | 0.2 | 0.2 | 0.2 | 0.2 | 0.2 |
| Molecular weight |  |  |  |  |  |
| Mn(× 1000) | 23,000 | 36,000 | 16,300 | 46,000 | 24,500 |
| Mw(× 1000) | 48,000 | 73,400 | 35,200 | 92,000 | 50,000 |

|  | PU19 | PU20 | PU21 | PU22 | PU23 |
|---|---|---|---|---|---|
| Polyester | IP/AA HG/BG | IP/TP NPG | IP/TP NPG | IP/AA NPG | IP/TP NPG |
| Diisocyanate | TDI | TDI | TDI | HDI | HDI |
| Polar group | $SO_3Na$ | $SO_3Na$ | NMDEA | NMDEA | DEAPD |
| (mmol/g) | 0.2 | 0.2 | 0.2 | 0.2 | 0.2 |
| Molecular weight |  |  |  |  |  |
| Mn(× 1000) | 31,000 | 41,000 | 30,000 | 23,600 | 20,500 |
| Mw(× 1000) | 62,500 | 83,200 | 61,000 | 49,600 | 42,000 |

| Glycols | EG | Ethylene glycol | Acids | TP | Terephthalic acid |
|---|---|---|---|---|---|
|  | PG | 1,3-propylene glycol |  | IP | Isophthalic acid |
|  | BG | 1,4-butanediol |  | AA | Adipic acid |
|  | NPG | Neopentyl glycol | Polar group source | DEAPD | Diethylamino propanediol |
|  | HG | 1,6-hexanediol |  | NMDEA | N-methyldiethanolamine |
|  | DMH | Dimethylol hexane |  | DEMPA | Dimethanol propionic acid |
|  | Gy | Glycerin |  | $SO_3Na$: | DMIS-containing Polyester (isophthalic acid/NPG/DMIS molecular weight of 1000) |
|  | TMP | Trimethylol propane |  |  |  |
|  | H-BPA | Hydrogenated bisphenol A | Isocyanate | MDI | 4,4-diphenylmethane diisocyanate |
|  | CHD | Cyclohexanediol |  | TDI | 2,4-toluene diisocyanate |
|  | CHDM | 1,4-cyclohexane dimethanol |  | HDI | Hexamethylene diisocyanate |

TABLE 2

| | Composition of binding agent of upper magnetic layer | | | Composition of binding agent of lower magnetic layer | | | Tape characteristics | | | | |
|---|---|---|---|---|---|---|---|---|---|---|---|
| | | | | | | | Video electro-magnetic transfer characteristics | | | | |
| | Kind of PU | Amount of addition | Amount of addition | Kind of PU | Amount of addition | Amount of addition | | | Sensitivity | Surface roughness | Durability |
| | See Table 1 | Parts by weight | Binding agent | Parts by weight | See Table 1 | Parts by weight | Binding agent | Parts by weight | 46.98 MHz | C/N | 1 kHz | (nm) | HDW-2000 |

| | Kind of PU | Parts by wt | Binding agent | Parts by wt | Kind of PU | Parts by wt | Binding agent | Parts by wt | 46.98 MHz | C/N | Sensitivity 1 kHz | Surface roughness (nm) | Durability HDW-2000 |
|---|---|---|---|---|---|---|---|---|---|---|---|---|---|
| Example 1 | PU1 | 10 | MR-110 | 8 | PU1 | 10 | MR-110 | 8 | +0.5 | +0.2 | +0.4 | 6.3 | ○ |
| Example 2 | PU2 | 10 | MR-110 | 8 | PU1 | 10 | MR-110 | 8 | +0.7 | +0.5 | +0.8 | 5.9 | ○ |
| Example 3 | PU3 | 10 | MR-110 | 8 | PU1 | 10 | MR-110 | 8 | +1.0 | +0.7 | +1.1 | 5.5 | ○ |
| Example 4 | PU4 | 10 | MR-110 | 8 | PU1 | 10 | MR-110 | 8 | +1.5 | +1.0 | +1.0 | 4.8 | ○ |
| Example 5 | PU5 | 10 | MR-110 | 8 | PU1 | 10 | MR-110 | 8 | +0.8 | +0.4 | +0.9 | 5.5 | ○ |
| Example 6 | PU6 | 10 | MR-110 | 8 | PU1 | 10 | MR-110 | 8 | +1.2 | +0.8 | +1.0 | 5.3 | ○ |
| Example 7 | PU7 | 10 | MR-110 | 8 | PU1 | 10 | MR-110 | 8 | +1.1 | +0.7 | +1.1 | 5.4 | ○ |
| Example 8 | PU8 | 10 | MR-110 | 8 | PU1 | 10 | MR-110 | 8 | +0.2 | +0.1 | +0.2 | 6.5 | ○ |
| Example 9 | PU9 | 10 | MR-110 | 8 | PU1 | 10 | MR-110 | 8 | +1.8 | +1.2 | +1.2 | 4.6 | ○ |
| Example 10 | PU10 | 10 | MR-110 | 8 | PU1 | 10 | MR-110 | 8 | +1.7 | +1.0 | +1.2 | 4.7 | ○ |
| Example 11 | PU11 | 10 | MR-110 | 8 | PU1 | 10 | MR-110 | 8 | +0.6 | +0.3 | +0.8 | 6.1 | ○ |
| Example 12 | PU12 | 10 | MR-110 | 8 | PU1 | 10 | MR-110 | 8 | +0.7 | +0.3 | +1.0 | 6.0 | ○ |
| Example 13 | PU13 | 10 | MR-110 | 8 | PU1 | 10 | MR-110 | 8 | +0.8 | +0.4 | +1.0 | 5.7 | ○ |
| Comparative Example 1 | PU14 | 10 | MR-110 | 8 | PU14 | 10 | MR-110 | 8 | +0.0 | +0.0 | +0.0 | 6.8 | Δ |
| Comparative Example 2 | PU15 | 10 | MR-110 | 8 | PU15 | 10 | MR-110 | 8 | −1.8 | −1.8 | −0.2 | 8.2 | Δ |
| Comparative Example 3 | PU16 | 10 | MR-110 | 8 | PU16 | 10 | MR-110 | 8 | −1.0 | −0.5 | −0.1 | 7.4 | Δ |
| Comparative Example 4 | PU17 | 10 | MR-110 | 8 | PU17 | 10 | MR-110 | 8 | −0.8 | −0.4 | +0.0 | 7.3 | Δ |
| Comparative Example 5 | PU18 | 10 | MR-110 | 8 | PU18 | 10 | MR-110 | 8 | −1.8 | −1.5 | −0.2 | 7.9 | Δ |
| Comparative Example 6 | PU19 | 10 | MR-110 | 8 | PU19 | 10 | MR-110 | 8 | −1.8 | −1.6 | −0.1 | 8.0 | Δ |
| Comparative Example 7 | PU20 | 10 | MR-110 | 8 | PU20 | 10 | MR-110 | 8 | −1.6 | −1.2 | +0.0 | 7.9 | Δ |
| Comparative Example 8 | PU21 | 10 | MR-110 | 8 | PU21 | 10 | MR-110 | 8 | −1.5 | −1.0 | +0.0 | 7.8 | Δ |
| Comparative Example 9 | PU22 | 10 | MR-110 | 8 | PU22 | 10 | MR-110 | 8 | −0.7 | −0.4 | −0.1 | 7.3 | Δ |
| Comparative Example 10 | PU23 | 10 | MR-110 | 8 | PU23 | 10 | MR-110 | 8 | −2.4 | −2.0 | −0.3 | 8.8 | Δ |

Trade name MR-110 produced by Nippon Zeon Co., Ltd., vinyl chloride copolymer including epoxy group, hydroxyl group and sulfate group, average degree of polymerization of 300 (JIS K 6721)

Trade name VINYLITE VAGH produced by Union Carbide Corporation, vinyl chloride-vinyl acetate-vinyl alcohol copolymer (degree of polymerization of 420)

Trade name VINYLITE VMCH produced by Union Carbide Corporation, vinyl chloride-vinyl acetate-maleic acid copolymer (degree of polymerization of 450)

TABLE 3

| | Kind of PU | Parts by wt | Binding agent | Parts by wt | Kind of PU | Parts by wt | Binding agent | Parts by wt | 46.98 MHz | C/N | Sensitivity 1 kHz | Surface roughness (nm) | Durability HDW-2000 |
|---|---|---|---|---|---|---|---|---|---|---|---|---|---|
| Example 14 | PU1 | 10 | VAGH | 8 | PU1 | 10 | VAGH | 8 | +0.3 | +0.1 | +0.2 | 6.7 | ○ |
| Example 15 | PU2 | 10 | VAGH | 8 | PU1 | 10 | VAGH | 8 | +0.5 | +0.4 | +0.5 | 6.3 | ○ |
| Example 16 | PU3 | 10 | VAGH | 8 | PU1 | 10 | VAGH | 8 | +0.7 | +0.6 | +0.6 | 6.2 | ○ |
| Example 17 | PU4 | 10 | VAGH | 8 | PU1 | 10 | VAGH | 8 | +1.3 | +0.6 | +0.8 | 5.6 | ○ |
| Example 18 | PU5 | 10 | VAGH | 8 | PU1 | 10 | VAGH | 8 | +0.4 | +0.4 | +0.5 | 6.5 | ○ |
| Example 19 | PU6 | 10 | VAGH | 8 | PU1 | 10 | VAGH | 8 | +0.7 | +0.5 | +0.6 | 6.0 | ○ |
| Example 20 | PU7 | 10 | VAGH | 8 | PU1 | 10 | VAGH | 8 | +0.6 | +0.6 | +0.5 | 6.6 | ○ |
| Example 21 | PU8 | 10 | VAGH | 8 | PU1 | 10 | VAGH | 8 | +0.1 | +0.0 | +0.1 | 6.8 | ○ |
| Example 22 | PU9 | 10 | VAGH | 8 | PU1 | 10 | VAGH | 8 | +1.4 | +1.0 | +0.5 | 5.3 | ○ |
| Example 23 | PU10 | 10 | VAGH | 8 | PU1 | 10 | VAGH | 8 | +1.3 | +0.8 | +0.4 | 5.5 | ○ |
| Example 24 | PU11 | 10 | VAGH | 8 | PU1 | 10 | VAGH | 8 | +0.9 | +0.2 | +0.5 | 6.0 | ○ |

TABLE 3-continued

| | Composition of binding agent of upper magnetic layer | | | Composition of binding agent of lower magnetic layer | | | Tape characteristics | | | | |
|---|---|---|---|---|---|---|---|---|---|---|---|
| | | | | | | | Video electromagnetic transfer characteristics | | | Surface | Durability |
| | Kind of PU | Amount of addition | Amount of addition | Kind of PU | Amount of addition | Amount of addition | | | Sensitivity | roughness | HDW- |
| | See Table 1 | Parts by weight | Binding agent | Parts by weight | See Table 1 | Parts by weight | Binding agent | Parts by weight | 46.98 MHz | C/N | 1 kHz | (nm) | 2000 |
| Example 25 | PU12 | 10 | VAGH | 8 | PU1 | 10 | VAGH | 8 | +1.1 | +0.1 | +0.5 | 5.7 | ○ |
| Example 26 | PU13 | 10 | VAGH | 8 | PU1 | 10 | VAGH | 8 | +1.3 | +0.3 | +0.5 | 5.4 | ○ |
| Comparative Example 11 | PU14 | 10 | VAGH | 8 | PU14 | 10 | VAGH | 8 | −0.5 | −0.1 | −0.3 | 7.3 | Δ |
| Comparative Example 12 | PU15 | 10 | VAGH | 8 | PU15 | 10 | VAGH | 8 | −2.6 | −2.0 | −0.2 | 9.3 | Δ |
| Comparative Example 13 | PU16 | 10 | VAGH | 8 | PU16 | 10 | VAGH | 8 | −1.9 | −0.6 | −0.3 | 8.6 | Δ |
| Comparative Example 14 | PU17 | 10 | VAGH | 8 | PU17 | 10 | VAGH | 8 | −2.0 | −1.0 | −0.3 | 8.8 | Δ |
| Comparative Example 15 | PU18 | 10 | VAGH | 8 | PU18 | 10 | VAGH | 8 | −2.4 | −1.3 | −0.3 | 8.9 | Δ |
| Comparative Example 16 | PU19 | 10 | VMCH | 10 | PU19 | 10 | VMCH | 10 | −3.0 | −2.3 | −1.0 | 8.9 | Δ |
| Comparative Example 17 | PU20 | 10 | VMCH | 10 | PU20 | 10 | VMCH | 10 | −3.1 | −2.9 | −1.0 | 9.1 | Δ |
| Comparative Example 18 | PU21 | 10 | VMCH | 10 | PU21 | 10 | VMCH | 10 | −3.3 | −3.0 | −1.3 | 9.0 | X |
| Comparative Example 19 | PU22 | 10 | VMCH | 10 | PU22 | 10 | VMCH | 10 | −3.4 | −3.1 | −1.0 | 9.5 | X |
| Comparative Example 20 | PU23 | 10 | VMCH | 10 | PU23 | 10 | VMCH | 10 | −3.5 | −3.2 | −1.1 | 9.7 | X |

Trade name MR-110 produced by Nippon Zeon Co., Ltd., vinyl chloride copolymer including epoxy group, hydroxyl group and sulfate group, average degree of polymerization of 300 (JIS K 6721)
Trade name VINYLITE VAGH produced by Union Carbide Corporation, vinyl chloride-vinyl acetate-vinyl alcohol copolymer (degree of polymerization of 420)
Trade name VINYLITE VMCH produced by Union Carbide Corporation, vinyl chloride-vinyl acetate-maleic acid copolymer (degree of polymerization of 450)

TABLE 4

| | Composition of binding agent of upper magnetic layer | | | Composition of binding agent of lower magnetic layer | | | Tape characteristics | | | | |
|---|---|---|---|---|---|---|---|---|---|---|---|
| | | | | | | | Video electromagnetic transfer characteristics | | | Surface | Durability |
| | Kind of PU | Amount of addition | Amount of addition | Kind of PU | Amount of addition | Amount of addition | | | Sensitivity | roughness | HDW- |
| | See Table 1 | Parts by weight | Binding agent | Parts by weight | See Table 1 | Parts by weight | Binding agent | Parts by weight | 46.98 MHz | C/N | 1 kHz | (nm) | 2000 |
| Example 9 | PU9 | 10 | MR-110 | 8 | PU1 | 10 | MR-110 | 8 | +1.8 | +1.2 | +1.2 | 4.6 | ○ |
| Example 27 | PU9 | 10 | MR-110 | 8 | PU9 | 5 | MR-110 | 13 | +2.0 | +0.4 | +0.4 | 4.5 | ○ |
| Example 28 | PU9 | 5 | MR-110 | 13 | PU9 | 5 | MR-110 | 13 | +1.6 | +1.0 | +1.3 | 5.0 | ○ |
| Example 29 | PU9 | 5 | MR-110 | 13 | PU9 | 13 | MR-110 | 5 | +1.7 | +0.3 | +1.2 | 5.1 | ○ |
| Example 30 | PU9 | 18 | — | — | PU9 | 18 | — | — | +1.9 | +1.5 | +1.2 | 4.7 | ○ |
| Example 31 | PU9 | 18 | — | — | PU11 | 18 | — | — | +1.7 | +1.0 | +1.0 | 5.3 | ○ |
| Example 32 | PU10 | 18 | — | — | PU10 | 18 | — | — | +1.5 | +1.2 | +1.1 | 5.2 | ○ |
| Example 33 | PU11 | 18 | — | — | PU11 | 18 | — | — | +0.8 | +0.8 | +1.0 | 5.6 | ○ |
| Example 34 | PU12 | 18 | — | — | PU12 | 18 | — | — | +0.7 | +0.5 | +0.9 | 5.8 | ○ |
| Example 35 | PU13 | 18 | — | — | PU13 | 18 | — | — | +0.9 | +0.6 | +0.9 | 6.0 | ○ |
| Comparative Example 21 | PU14 | 18 | — | — | PU9 | 18 | — | — | −0.2 | −0.1 | +0.9 | 6.9 | Δ |
| Comparative Example 22 | PU15 | 18 | — | — | PU9 | 18 | — | — | −2.0 | −1.7 | +0.8 | 8.6 | Δ |
| Comparative Example 23 | PU16 | 18 | — | — | PU9 | 18 | — | — | −1.0 | −0.6 | +0.9 | 7.6 | Δ |
| Comparative Example 24 | PU9 | 18 | — | — | PU14 | 18 | — | — | +1.4 | +0.5 | −0.3 | 5.2 | ○ |
| Comparative Example 25 | PU9 | 18 | — | — | PU15 | 18 | — | — | +1.2 | +0.6 | −0.2 | 5.6 | ○ |
| Comparative Example 26 | PU9 | 18 | — | — | PU16 | 18 | — | — | +1.0 | +0.4 | −0.2 | 5.5 | ○ |

TABLE 4-continued

|  | Composition of binding agent of upper magnetic layer | | | Composition of binding agent of lower magnetic layer | | | Tape characteristics | | | | |
|---|---|---|---|---|---|---|---|---|---|---|---|
|  | | | | | | | Video electro-magnetic transfer characteristics | | | | |
|  | Kind of PU | Amount of addition | Amount of addition | Kind of PU | Amount of addition | Amount of addition | 46.98 MHz | | Sensitivity 1 kHz | Surface roughness (nm) | Durability HDW-2000 |
|  | See Table 1 | Parts by weight | Binding agent Parts by weight | See Table 1 | Parts by weight | Binding agent Parts by weight | | C/N | | | |
| Comparative Example 27 | PU14 | 18 | — — | PU14 | 18 | — — | −0.2 | +0.0 | −0.2 | 7.2 | Δ |
| Comparative Example 28 | PU15 | 18 | — — | PU15 | 18 | — — | −1.6 | −1.5 | −0.3 | 7.9 | Δ |
| Comparative Example 29 | PU16 | 18 | — — | PU16 | 18 | — — | −0.8 | −0.6 | −0.3 | 7.3 | Δ |

Trade name MR-110 produced by Nippon Zeon Co., Ltd., vinyl chloride copolymer including epoxy group, hydroxyl group and sulfate group, average degree of polymerization of 300 (JIS K 6721)
Trade name VINYLITE VAGH produced by Union Carbide Corporation, vinyl chloride-vinyl acetate-vinyl alcohol copolymer (degree of polymerization of 420)
Trade name VINYLITE VMCH produced by Union Carbide Corporation, vinyl chloride-vinyl acetate-maleic acid copolymer (degree of polymerization of 450)

In the Table 2, the Comparative Examples 1 to 10 indicate cases in which polyurethane resin including no alicyclic group and vinyl chloride copolymer (produced by Nippon Zeon Co., Ltd., MR-110) are used. In these Comparative Examples, the durability cannot be satisfied and the video electromagnetic transfer characteristics are low. As compared therewith, in the Examples 1 to 13, a polyurethane resin including the alicyclic group is combined with a vinyl chloride copolymer. As apparent from the Table 2, in any of the combinations with the same vinyl chloride copolymers of the Comparative Examples, the durability and the electromagnetic transfer characteristics are good.

Here, in the Examples 1 to 5, the content of a tertiary amine polar group in the polyurethane resin having the same composition is respectively changed. When the quantity of the polar group of the tertiary amine is not higher than 0.05 mmol/g, the electromagnetic transfer characteristics of a video are slightly lower than those of other Examples. Further, even when the quantity of the polar group of the tertiary amine is increased to 0.5 mmol/g or more, an effect of the electromagnetic transfer characteristics seems to be saturated. Further, when carboxylic acid is used as the polar group, its effect for the electromagnetic transfer characteristics is apparently low, which supports the claims of the present invention. In this case, although an attempt to synthesize a polyurethane resin including carboxylic acid of 0.05 mmol/g or more was made, since the carboxylic acid had a non-catalytic effect to an urethane forming reaction, a desired polyurethane resin could not be obtained.

The Table 3 likewise shows examples in which vinyl chloride-vinyl acetate copolymer VAGH or vinyl chloride-vinyl acetate copolymer VMCH produced by Union Carbide Corporation is combined with a polyurethane resin having the same composition as that of the Table 2. In the Examples 14 to 26, the durability and the electromagnetic transfer characteristics are good like the Examples 1 to 13. However, since the dispersion characteristics of the VAGH are inferior due to the combination with the MR-110, the electromagnetic transfer characteristics are apparently inferior to those of the Examples 1 to 13. On the other hand, in all of the Comparative Examples 11 to 20, the electromagnetic transfer characteristics are low. Especially, the durability is extremely deteriorated under the combination with the VMCH.

While the Example 9 indicates an example in which a ratio of MR-110 to a polyurethane resin is the same between the upper layer and the lower layer, the Examples 27 to 29 shown in the Table 4 indicates examples in which a ratio of MR-110 to a polyurethane resin is different between the upper layer and the lower layer. In the Examples 27 and 29, since the composition of the binding agent is different between the upper layer and the lower layer, a difference is generated in viscosity characteristics of the magnetic paint between the upper layer and the lower layer. Therefore, since an interface between the upper layer and the lower layer is discontinuous, C/N tends to be deteriorated. On the other hand, in the Example 28, although the ratio of MR-110 to the polyurethane resin is different from that of the Example 9, since the composition of the binding agent is the same between the upper layer and the lower layer, the C/N is good.

Further, the Examples 30 to 35 show examples in which only the polyurethane resin of the present invention is employed for the upper layer and the lower layer. Results of all of them are good. Accordingly, an excellent magnetic recording medium can be obtained without combining with a vinyl chloride copolymer. Therefore, these Examples show an effective method for producing a magnetic recording medium good in its characteristics without using a chlorine resin that is considered as a material for destroying an ozone layer.

The Comparative Examples 21 to 23 show examples in which the lower layer is made of the polyurethane resin of the present invention and the upper layer is made of the polyurethane resin of the Comparative Examples. In this case, a roughness is inferior and the output of the video is slightly low, however, audio characteristics are good. Further, the durability of the upper layer sliding with a head is apparently slightly low. On the other hand, the Comparative Examples 24 to 26 show examples in which the upper layer is made of the polyurethane resin of the present invention and the lower layer is made of the polyurethane resin of the Comparative Examples. In the above-described Comparative Examples, although the electromagnetic transfer characteristics of a video are good, audio characteristics have no apparent effect, conversely to the former.

The Comparative Examples 27 to 29 show examples in which the polyurethane resin of the Comparative Examples is used for the upper and lower layers. As apparent from the results shown in the Table 4, the electromagnetic transfer characteristics of the above-described Comparative Examples are lower than those of the Examples 30 to 35 using the polyurethane resin of the present invention and the durability of the former is lower than that of the latter.

According to the present invention, the upper layer directly sliding with a magnetic head includes carbon black having a relatively large particle size which has an effect for suppressing the increase of a friction generated due to running operations of many times. The lower layer includes carbon black having a small particle size that is highly effective for suppressing a sticking to a mechanical part of a VTR due to static electricity. Thus, the deterioration of the electromagnetic transfer characteristics can be suppressed to a minimum and the durability can be improved.

Further, it was recognized that while the lower magnetic layer did not slide directly with the magnetic head, when the film was cut into the form of a tape, the end face (edge part) of the tape came into contact with a guide roll or the like, dropping powder was scattered on a travel system of the VTR. Further, in a helical scanning type VTR, since the head rubs the edge part of the tape especially during a still reproducing, the powder dropping from the end face of the edge part of the tape obviously seriously affects the deterioration of the electromagnetic transfer characteristics and durability. Therefore, a non-magnetic filler component having Mohs scale of 6 or higher which has an abrasive force is included in the lower layer so that the drop of powder can be reduced.

<Carbon Black used in the Present Invention>

As the carbon black which can be used in the magnetic recording medium according to the present invention, the upper layer uses the carbon black of a large particle size as large as 200 nm to 400 nm (0.2 µm to 0.4 µm). This particle size is desirably the same or not larger than that of the upper magnetic layer. However, even when the carbon black having a particle size having the thickness of the upper layer or more is used, the particle size absorbed to the lower layer can be expected upon specular processes such as applying, drying and calendering magnetic paint. Accordingly, even for the thickness of the upper layer having about 0.2 µm to 0.3 µm necessary for a digital recording, the carbon black having the particle size of about 0.3 µm can be used. An amount of addition of the carbon black having the large particle size included in the upper layer is preferably located within a range of 0.2 parts by weight to 2.0 parts by weight in terms of weight ratio of magnetic powder, and more preferably located within a range of 0.5 parts by weight to 1.0 parts by weight. When the amount of addition of the carbon black having the large particle size is large, too many protrusions are formed on the surface of the magnetic layer. Thus, traveling characteristics are improved, however, the electromagnetic transfer characteristics (especially, a digital signal) are seriously deteriorated. Further, when the amount of the carbon black having the large particle size is small, the traveling characteristics are deteriorated and troubles such as sticking are apt to be generated upon traveling many times under an environment of low temperature and low humidity.

As the carbon black having the large particle size used in such an upper layer, carbon black for rubber having ASTM codes of N800 to N900 series may be ordinarily employed. Especially, MT carbon (Medium Thermal/intermediate particle thermal decomposition) and FT carbon (Fine Thermal/fine particle thermal decomposition) may be employed. Sevacarb MT (produced by Colombian Carbon Corporation, particle size of 350 nm), Sevacarb MT-CI (produced by Colombian Carbon Corporation, particle size of 300 nm), Thermal Carbon Black N990 (produced by US Engineered Carbons Inc., particle size of 250 nm), Cancarb MT (produced by Canada Cancarb Ltd., average particle size of 280 nm) or the like may be employed.

Further, in the carbon black used in the lower magnetic layer, DBP oil absorption is located within a range of 30 to 150 ml/100 g and preferably located within a range of 50 to 150 ml/100 g. An average particle size is located within a range of 5 to 80 nm and preferably located within a range of 15 to 50 nm. A specific surface area by a BET method is effectively located within a range of 40 to 300 $m^2$/g and preferably located within a range of 100 to 250 $m^2$/g. Further, a tap density is located within a range of 0.1 to 1 g/cc and pH is preferably located within a range of 2.0 to 10. The carbon black having a larger quantity of DBP oil absorption is high in its viscosity and is seriously poor in its dispersion characteristics. When the carbon black is low in its DBP oil absorption, the dispersion characteristics are low, so that a dispersion process takes much time. As the average particle size becomes smaller, the dispersion process requires more time, but surface characteristics are the more improved. As the particle size becomes larger, the surface characteristics become the worse. Therefore, the above-described range is preferable.

As the carbon blacks which satisfy the above-described conditions, for instance, a trade name RAVEN 1250 (particle size of 23 nm, BET value of 135.0 $m^2$/g, DBP oil absorption of 58.0 ml/100 g) produced by Colombian Carbon Corporation, RAVEN 1255 (particle size of 23 nm, BET value of 125.0 $m^2$/g, DBP oil absorption of 58.0 ml/100 g), RAVEN 1020 (particle size of 27 nm, BET value of 95.0 $m^2$/g, DBP oil absorption of 60.0 ml/100 g), RAVEN 1080 (particle size of 28 nm, BET value of 78.0 $m^2$ g, DBP oil absorption of 65.0 m/100 g), RAVEN 1035, RAVEN 1040, RAVEN 1060, RAVEN 3300, RAVEN 450, RAVEN 780, etc., or a trade name SC (particle size of 20 nm, BET value of 220.0 $m^2$/g, DBP oil absorption of 115.0 ml/100 g) produced by CONDUCTEX Corporation may be used.

Further, a trade name #80 (particle size of 23 nm, BET value of 117.0 $m^2$/g, DBP oil absorption of 113.0 ml/100 g) produced by Asahi Carbon Co., Ltd., a trade name #22B (particle size of 40 nm, BET value of 5.0 $m^2$/g, DBP oil absorption of 131.0 ml/100 g) and #20B (particle size of 40 nm, BET value of 56.0 $m^2$/g, DBP oil absorption of 115.0 ml/100 g) produced by Mitsubishi Chemical Industries Ltd., a trade name BLACK PEARLS L (particle size of 24 nm, BET value of 250.0 $m^2$/g, DBP oil absorption of 60.0 ml/100 g) produced by Cabot Corporation, BLACK PEARLS 800 (particle size of 17.0 nm, BET value of 240.0 $m^2$/g, DBP oil absorption of 75.0 ml/100 g), BLACK PEARLS 1000, BLACK PEARLS 1100, BLACK PEARLS 700, BLACK PEARLS 905, etc. may be employed.

Here, for the upper magnetic layer, the carbons used in the above-described lower magnetic layer may be combined together and the combinations may be employed as well as the carbon having the large particle size.

<Abrasive used in the Present Invention>

In the present invention, non-magnetic fine powder having Mohs scale of 6 or higher can be used as an abrasive. As the abrasives, for instance, α-alumina with α-formation rate of 90% or higher, β-alumina, γ-alumina, silicon carbide, chromium oxide, cerium oxide, α-iron oxide, corundum, silicon nitride, titanium carbide, titanium oxide, silicon dioxide, tin oxide, magnesium oxide, tungsten oxide, zirconium oxide, boron nitride, zinc oxide, calcium carbonate, calcium sulfate, barium sulfate, molybdenum disulfide, needle shaped a iron oxide obtained by dehydrating and annealing material of magnetic iron oxide or products obtained by performing a surface treatment on them as required by aluminum and/or silica, etc. are independently used or the combinations thereof are used.

The particle size of the abrasive employed in the upper magnetic layer preferably has an average particle size corresponding to a half of the thickness t2 of the upper magnetic layer to t2. The thickness t2 of the upper magnetic layer is ordinarily located within a range of 0.05 μm to 1.0 μm by a Wet-on-Wet method from the viewpoints that the characteristics of a digital recording are ensured and the continuous surface of the magnetic layer is formed in a stable way. However, in the present invention, t2 is more effectively located within a range of 0.2 μm to 0.8 μm from the viewpoint that the electromagnetic transfer characteristics are compatible with the durability. Accordingly, the average particle size of the abrasive employed in the upper magnetic layer is located within a range of 0.1 μm to 0.8 μm. When the abrasive having a particle size not smaller than the thickness of the upper magnetic layer is used, the increase of the wear of a head (the amount of abrasion of a head) or the deterioration of the electromagnetic transfer characteristics are cared about. Further, when the abrasive having a small particle size not larger than a half of the thickness of the upper magnetic layer is used, the protrusions of the abrasive protruding on the surface by specular processes such as applying, drying and calendering magnetic paint are too small, so that the durability is deteriorated. At this time, a method for increasing an amount of addition of the abrasive having a small particle size may be considered. In this case, the density of a magnetic material is lowered to deteriorate the electromagnetic transfer characteristics.

The abrasive used in the lower magnetic layer is added to improve the durability of the end face (edge part) of the film when the film is cut and the average particle size of the abrasive is desirably not larger than the total thickness of a magnetic film of the upper magnetic layer and the lower magnetic layer. Accordingly, in the present invention, the abrasive having an average particle size preferably located within a range of 0.2 to 3.0 μm and more preferably located within a range of 0.2 to 0.5 μm may be employed.

As other characteristics of the abrasive that can be used in the present invention, the tap density of the non-magnetic powder is ordinarily located within a range of 0.05 to 2 g/cc, and preferably located within a range of 0.2 to 1.5 g/cc. The specific surface area of the non-magnetic powder is ordinarily located within a range of 1 to 200 m$^2$/g, desirably located within a range of 5 to 100 m$^2$/g and further desirably located within a range of 7 to 80 m$^2$/g. The size of the crystallite of the non-magnetic powder is ordinarily located within a range of 0.01 to 2 WU, preferably located within a range of 0.015 to 1.00 μm and further preferably located within a range of 0.015 to 0.50 μm. The oil absorption using DBP of the non-magnetic powder is ordinarily located within a range of 5 to 100 ml/100 g, desirably located within a range of 10 to 80 ml/100 g and further desirably located within a range of 20 to 60 ml/100 g. The specific gravity of the non-magnetic powder is ordinarily 1 to 12 and preferably 2 to 8. The form of the non-magnetic powder may be any of a needle shape, a spherical shape, a die shape, and a plate shape.

The non-magnetic powder is not necessarily completely pure and the surface thereof may be processed by other compound depending on its purpose. At this time, its purity may be 70% or higher so that an effect is not decreased. For instance, when titanium oxide is used, the surface is ordinarily treated by alumina. The ignition loss may be desirably 20% or lower.

As the specific examples of the abrasives used in the present invention, there may be exemplified trade names UA 5600 and UA 5605 produced by Showa Denko K. K., trade names AKP-20, AKP-30, AKP-50, HIT-50, HIT-100 and ZA-GI produced by Sumitomo Chemical Co., Ltd., trade names G5, G7 and S-1 produced by Nippon Chemical Industrial Co., Ltd., trade names TF-100, TF-120, TF-140, DPN 250BX and DBN 270BX produced by Toda Kogyo Corporation, trade names TTO-51B, TTO-55A, TTO-55B, TTO-55C, TTO-SSS, TTO-55D, FT-1000, FT-2000, FTL-100, FTL-200, M-1, S-1 and SN-100 produced by Ishihara Sangyo Kaisha Ltd., trade names ECT-52, STT-4D, STT-30D, STT-30 and STT-65C produced by Titan Kogyo K. K., a trade name T-1 produced by Mitsubishi Materials Corporation, trade names NS-O, NS-3Y and NS-8Y produced by Nippon Shokubai Co., Ltd., trade names MT-100S, MT-100T, MT-1SOW, MT-500B, MT-600B and MT-100F produced by Tayca Corporation, trade names FINE X-25, BF-1, BF-10, BF-20, BF-1L and BF-10P produced by Sakai Chemical Industry Co., Ltd., trade names DEFIC-Y and DEFIC-R produced by Dowa Mining Co., Ltd. and a trade name Y-LOP produced by Titan Kogyo K. K.

The amount of addition of the abrasive to the upper magnetic layer is located within a range of 4 to 10% in the weight ratio of magnetic powder, and preferably located within a range of 5 to 8%. In the case of the lower magnetic layer, the amount of addition of the abrasive is likewise located within a range of 4 to 10%. When the amount of addition of the abrasive to the upper magnetic layer is large, the increase of the wear of the head and the deterioration of the electromagnetic transfer characteristics are generated. When the amount of addition of the abrasive to the upper magnetic layer is small, the durability is deteriorated. When the amount of the abrasive in the lower magnetic layer is large, characteristics related to audio systems are deteriorated. When the amount of the abrasive of the lower magnetic layer is small, the damage of the edge part due to running many times or the like is inconveniently generated.

As ferromagnetic powder used in the present invention, well-known ferromagnetic materials such as γ-FeOx (x=1.33 to 1.5), Co modified γ-FeOx (x=1.33 to 1.5), a ferromagnetic alloy including Fe, Ni, or Co as a main component (75% or more), barium ferrite, strontium ferrite, etc. may be employed. In the above-described ferromagnetic powder, atoms such as Al, Si, S, Sc, Ti, V, Cr, Cu, Y, Mo, Rh, Pd, Ag, Sn, Sb, Te, Ba, Ni, Ta, W, Re, Au, Hg, Pb, Bi, La, Ce, P, Mn, Zn, Co, Sr, B, etc. may be included as well as prescribed atoms.

More useful magnetic powder in the present invention is ferromagnetic fine metal powder that shows an outstanding effect under conditions of saturation magnetization σs=100 Am$^2$/kg to 200 Am$^2$/kg, a specific surface area of 45 to 60 m$^2$/g by a BET method, and anti-magnetic force of 100 kA/m to 200 kA/m.

Here, different ferromagnetic fine powder is preferably used for the upper layer and the lower layer respectively. The upper layer uses the magnetic powder meeting a video signal and the lower layer uses the magnetic powder meeting an audio signal. As the particle size of metal powder used for the magnetic recording medium according to the present invention, an average major axis length is suitably 0.01 to 0.5 μm both for the upper and lower layers, and more preferably 0.4 to 0.2 μm. When the particle size of the metal powder is smaller than 0.01 μm, the metal powder has a super paramagnetism and its electromagnetic transfer characteristics are seriously deteriorated. When the particle size of the metal powder exceeds 0.4 µm, the metal particles have many magnetic domains to lower the electromagnetic transfer characteristics. Accordingly, to maintain the intended magnetic characteristics of the magnetic recording medium having a multiple structure, a needle shaped fine particle having an average major axis length of 0.01 to 0.4 µm is preferable. Here, as the particle size of the metal powder becomes small, the dispersion characteristics of magnetic paint are more deteriorated, and the recording wavelength on the lower layer is longer than that on the upper layer. Therefore, the particle size used in the lower layer is desirably larger than that used in the upper layer.

The specific surface area (BET) of the metal powder is suitably 25 to 70 m$^2$/g, and more preferably 40 to 60 m$^2$/g. When the specific surface area of the metal powder is smaller than 25 m$^2$/g, a compatibility with a resin upon formation of a tape is deteriorated to lower the electromagnetic transfer characteristics. Further, when the specific surface area of the metal powder exceeds 70 m$^2$/g, an imperfect dispersion is generated upon formation of a tape to likewise deteriorate the electromagnetic transfer characteristics.

The size of the crystallite of the metal magnetic powder is suitably 50 to 250 Å, and more preferably 100 to 200 Å. When the size of the crystallite of the metal magnetic powder is smaller than 50 Å, the magnetic powder has a super paramagnetism to seriously lower the electromagnetic transfer characteristics. When the size of the crystallite of the metal magnetic powder exceeds 250 Å, noise is increased to deteriorate the electromagnetic transfer characteristics.

The magnetic powder of the upper layer desirably includes Co in order to obtain a high output having video characteristics and ensure a weather resistance for enduring storage for a long time. When the content of Co is lower than 3 at. %, such operational effects may not be adequately obtained. Accordingly, the content of Co included in the magnetic powder of the upper layer ranges from 3 at. % to 50 at. %, more preferably ranges from 5 to 40 at. %, and further preferably ranges from 5 to 35 at. %. Here, at. % indicates the percentage of atoms.

As an element included in the metal magnetic powder, Al has a remarkable effect for improving the dispersion characteristics (sintering prevention property) of the needle shaped fine powder and holding the forms of particles upon reducing. When the content of Al is lower than 0.1 at. %, such an effect is hardly exhibited. When the content of Al is so large as to exceed 20 at. %, the above-described saturation magnetization σs is lowered and the magnetic characteristics are deteriorated. Accordingly, the content of Al is located within a range of 0.1 to 20 at. %, preferably within a range of 1 to 15 at. %, and more preferably within a range of 5 to 10 at. %. In this case, when Al is contained as a compound (oxide), the content does not refer to the quantity of the compound and refers to the content of the element Al in the compound.

Y (or other rare earth elements) is likewise included in the magnetic powder so that the dispersion characteristics of the paint are improved and the video output is more improved. Y effectively serves to prevent the metal powder from being sintered, and accordingly, improve the dispersion characteristics. When the content of Y in the magnetic powder is lower than 0.1 at. %, its effect is low so that the metal power is easily sintered. When the content of Y in the magnetic powder exceeds 10 at. %, the quantity of the oxide of the element is increased to decrease the saturation magnetization σs, so that the magnetic powder is not proper as the magnetic metal powder for the second magnetic layer (upper layer). Further, the content of Y effective for improving the dispersion characteristics of the paint is located within a range of 0.5 to 5.0 at. %. As the rare earth elements, Y, La, Ce, Pr, Nd, Sm, Th, Dy, Gd, etc. may be exemplified. When these elements are compounded, the total quantity is set to 0.1 to 10 at. %. When these elements are contained as compounds, the content does not refer to the quantity of the compound and refers to the content of the elements respectively in the compounds.

As for other elements to be added to the magnetic powder for the upper layer and the lower layer, usually well-known elements may be used.

In the magnetic recording medium according to the present invention, any of conventionally known materials may be applied without limitation to a binding agent, an abrasive, an antistatic agent, a rust preventive including composition except that of the ferromagnetic magnetic powder mixed into the magnetic layers, solvents used for preparing magnetic paint, and non-magnetic supporters.

As materials of the non-magnetic supporters, materials ordinarily used for the magnetic recording medium can be employed. For instance, polyesters such as polyethylene terephthalate, polyethylene naphthalate, etc., polyolefines such as polyethylene, polypropylene, etc., cellulose derivatives such as cellulose triacetate, cellulose diacetate, cellulose acetate butylate, etc., vinyl resins such as polyvinyl chloride, polyvinylidene chloride, etc., polycarbonate, polyimide, polyamide imide, other plastics, metals such as aluminum, copper, etc., light alloys such as aluminum alloy, titanium alloy, etc., ceramics, single crystal silicon, etc. may be enumerated.

As the binding agent to be used in the magnetic layer, any of known materials may be used. Specifically, they may include vinyl chloride-vinyl acetate copolymer, vinyl chloride-vinyl acetate-vinyl alcohol copolymer, vinyl chloride-vinylidene chloride copolymer, vinyl chloride-acrylonitrile copolymer, vinyl chloride-vinyl acetate-maleic acid copolymer, acrylic ester-vinylidene chloride copolymer, acrylic ester-acrylonitrile copolymer, methacrylic acid-vinylidene chloride copolymer, methacrylic ester-styrene copolymer, thermoplastic polyurethane resin, phenoxy resin, polyvinyl fluoride, vinylidene chloride-acrylonitrile copolymer, butadiene-acrylonitrile copolymer, acrylonitrile-butadiene-methacrylic acid copolymer, polyvinyl butyral, cellulose derivative, styrene-butadiene copolymer, polyester resin, phenolic resin, epoxy resin, thermosetting polyurethane resin, urea resin, melamine resin, alkyd resin, urea-formaldehyde resin, polyvinyl acetal resin or mixtures of them, etc.

Especially, polyurethane resins, polyester resins, acrylonitrile-butadiene copolymers or the like which are considered to apply a flexibility, cellulose derivatives, phenolic resins, epoxy resins or the like which are considered to apply a rigidity are desired. These binding agents may be cross-linked with isocyanate compound to improve durability or may have a suitable polar group introduced.

As a lubricant, any of usually known lubricants may be used. For instance, fluorine lubricants such as higher fatty acid esters, silicone oil, fatty acid modified silicon, fluorine-containing silicon, etc., amine lubricants such as polyolefine, polyglycol, alkyl phosphoric esters and metal salts, polyphenyl ethers, fluorinated alkylethers, alkyl carboxylic acid amine salts and fluorinated alkyl carboxylic acid amine salts, alcohols having the number of carbons of 12 to 24 (may respectively include unsaturated hydrocarbons or branch), higher fatty acids having the number of carbons of 12 to 24, etc. may be employed.

Further, as the components of the above-described higher fatty acid esters, higher fatty acid esters having the number of carbons of 12 to 32 (may respectively include unsaturated fatty acids or branch) may be used. For instance, methyl esters, ethyl esters, propyl esters, isopropyl esters, butyl esters, pentyl ester, hexyl esters, heptyl esters, octyl esters, etc. of lauric acid, myristic acid, palmitic acid, stearic acid, isostearic acid, arachic acid, oleic acid, eicosanoic acid, elaidic acid, behenic acid, linoleic acid, linolenic acid, etc. may be exemplified.

As the names of specific compounds, butyl stearate, pentyl stearate, heptyl stearate, octyl stearate, isooctyl stearate, butoxyethyl stearate, octyl myristate, isooctyl myristate, butyl palmitate, etc. may be exemplified. Further, as the lubricant, a plurality of lubricants may be mixed together.

As the antistatic agent, well-known antistatic agents such as a natural surface active agent, a nonion surface active agent, a cation surface active agent, etc. may be employed as well as the above-described carbon black.

In the present invention, a known coupling agent may be employed. As the coupling agent, a silane coupling agent, a titanate coupling agent, an aluminum coupling agent, etc. may be exemplified. Here, the quantity of the coupling agent to be added to the magnetic powder of 100 parts by weight is preferably located within a range of 0.05 to 10.00 parts by weight and more preferably located within a range of 0.1 to 5.00 parts by weight.

As the silane coupling agents, vinyl silane compounds such as γ-methacryloxypropyl trimethoxy silane, vinyltriethoxy silane, etc., epoxy silane compounds such as β-(3,4-epoxycyclohexyl)ethyltrimethoxy silane, γ-glycidoxypropyl trimethoxy silane, etc., amino silane compounds such as γ-aminopropyl triethoxy silane, N-β(aminoethyl)γ-aminopropyl methyldimethoxy silane, etc., mercapto silane compounds such as γ-mercaptopropyl trimethoxy silane, etc. may be preferably suitably used.

As the titanate coupling agents, tetra-n-butoxy titanium, tetraisopropoxy titanium, bis[2-[(2-aminoethyl)amino]ethanolate][2-[(2-aminoethyl)amino]ethanolate-0](2-propanolate)titanium, tris(isooctadecanoate-0)(2-propanolate)titanium, bis(ditridecyl phosphite-0")tetrakis(2-propanolate) dihydrogen titanate, bis(dioctyl phosphite-0")tetrakis(2-propanolate)dihydrogen titanate, tris(dioctyl phosphite-0") (2-propanolate)titanium, bis(dioctyl phosphite-0") [1,2 ethanediolate(2-)-0,0']titanium, tris(dodecylbenzene sulfonate-0)(2-propanolate)titanium, tetrakis [2,2-bis [(2-propenyloxy)methyl]-1-butanolate titanate, etc. may be exemplified.

As specific trade names, for example, PLENACT KR TTS, KR 46B, KR 55, KR 41B, KR 38S, KR 138S, KR 238S, 338×, KR 12, KR 44, KR 9SA, KR 34S, etc. produced by Ajonomoto Co., Inc. may be preferably employed.

As the aluminum coupling agents, acetoalkoxy aluminum diisopropylate or the like may be exemplified. As a specific trade name, PLENACT AL-M or the like produced by Ajinomoto Co., Inc. may be preferably suitably used.

In the present invention, to provide a higher durability, an isocyanate curing agent having the average number of functional groups of 2 or more may be included. That is, polymeric materials of polyisocyanate or polyol adducts of polyisocyanate may be preferably suitably used in the present invention. Isocyanurate having a cyclic framework as the trimer of diisocyanate is a curing agent excellent in its reactivity and effective for improving the durability.

As the isocyanate curing agents, aromatic polyisocyanates and aliphatic polyisocyanates are exemplified. Adducts of active hydrogen compounds and them are preferable.

As the aromatic polyisocyanates, toluene diisocyanate (TDI), 1,3-xylene diisocyanate, 1,4-xylene diisocyanate, 4,4'-diphenyl methane diisocyanate (MDI), p-phenyl diisocyanate, m-phenyl diisocyanate, 1,5-naphthyl diisocyanate, etc. may be exemplified.

Further, as aliphatic polyisocyanates, hexamethylene diisocyanate (HDI), dicyclohexylmethane diisocyanate, cyclohexane diisocyanate, isophorone diisocyanate (IPDI), etc. may be exemplified.

As active hydrogen compounds forming adducts with the above-described materials, ethylene glycol, 1,4-butanediol, 1,3-butanediol, neopentyl glycol, diethylene glycol, trimethylol propane, glycerin, etc. may be exemplified. They preferably have an average molecular weight located within a range of 100 to 5000.

An amount of addition of the curing agent is generally located within a range of 0 to 20 parts by weight in the weight ratio of a binder resin, and preferably located within a range of 0 to 10 parts by weight. Herein, the weight of the curing agent which is theoretically an amount of isocyanate equivalent to the active hydrogen in a polyurethane resin composition (or a binding agent resin composition) is adequately an amount of addition of the curing agent. However, in an actual production, isocyanate as the component of the curing agent reacts due to the existence of water or the like, so that the amount of isocyanate equivalent to that of the active hydrogen is frequently insufficient. Accordingly, the curing agent having an amount more excessive by 10% to 50% than the equivalent of the active hydrogen is effectively added.

Further, when the curing agent composed of polyisocyanate is used, after magnetic paint is coated, a curing reaction is accelerated for several hours at the temperature of 40° C. to 80° C. to obtain adhesive characteristics.

As solvents for preparing the magnetic paint, ketone solvents such as acetone, methyl ethyl ketone, methyl isobutyl ketone, cyclohexanone, etc., ester solvents such as methyl acetate, ethyl acetate, butyl acetate, ethyl lactate, ethyl acetate monoethyl ether, etc., glycol ether solvents such as glycol monoethyl ether, dioxane, etc., aromatic hydrocarbon solvents such as benzene, toluene, xylene, etc., chlorine-containing solvents such as methylene chloride, ethylene chloride, carbon tetrachloride, chloroform, ethylene chlorohydrin, dichlorobenzene, etc. may be enumerated. Further, other conventionally known organic solvents may be employed.

As methods for preparing the magnetic paint, any of well-known methods can be used. For example, a roll mill, a ball mill, a sand mill, a trommel, a high speed stone mill, a basket mill, a dispersion mill, a homo-mixer, a kneader, a continuous kneader, an extruder, a homogenizer and a ultrasonic dispersing machine, etc. may be used.

In the magnetic recording medium according to the present invention, a non-magnetic back coat layer may be provided on a surface of the non-magnetic supporter opposite to the magnetic layer. The thickness of the back coat layer may be located within a range of 0.3 to 1.0 μm and a well-known material may be used for the back coat layer.

In application of the magnetic paint, before the magnetic paint is directly applied to the non-magnetic supporter, an undercoat layer of an adhesive layer may be provided on the non-magnetic supporter or a pretreatment such as a corona discharge process or an electron beam irradiation process may be applied on the non-magnetic supporter.

As a method for applying the magnetic paint on the non-magnetic supporter, well-known methods may be used which include an air doctor coating, a blade coating, a rod coating, an extrusion coating, an air knife coating, a squeeze coating, an impregnation coating, a reverse roll coating, a gravure coating, a transfer roll coating, a cast coating, etc. Further, in the present invention, a simultaneous multi-layer application method by an extrusion coating may be effectively used as well as the above-described methods.

Here, for the purpose of improving an adhesive strength, the above-described layer (undercoat layer) including a well-known binding agent as a main component may be provided between the non-magnetic supporter and the first magnetic layer (lower layer).

Example 2

<Manufacture of Magnetic Layers>

Each paint forming each magnetic layer was prepared on the basis of a below-described composition.

| <Production of paint of upper magnetic layer> | |
|---|---|
| magnetic metal powder: | 100 parts by weight |
| average length of major axis: | 0.15 μm |
| specific surface area: | 60 m$^2$/g by BET method |
| coercive force Hc: | 125 (kA/m) |
| saturation magnetization σs: | 120 (Am$^2$/kg) |
| vinyl chloride copolymer: | 15 parts by weight |
| (produced by Nippon Zeon Co., Ltd. trade name: MR-110) | |
| polyester polyurethane resin: | 5 parts by weight |
| (isophthalic acid/terephthalic acid/ neopentyl glycol-MDI polyurethane; molecular weight of 25000, polar group = SO$_3$Na of 0.2 wt %) | |
| abrasive: | variable |
| (The detail is described in Table 5 shown below.) | |
| carbon black having a large particle size: | variable |
| (The detail is described in Table 5 shown below.) | |
| carbon black: | 1 parts by weight |
| (produced by Cabot Corporation, trade name: BP-L) | |
| polyisocyanate: | 4 parts by weight |
| (produced by Nippon Polyurethane Industry Co., Ltd., trade name: Coronate L, in this case, polyisocyanate was mixed immediately before application.) | |
| myristic acid: | 1 parts by weight |
| butyl stearate: | 1 parts by weight |
| methyl ethyl ketone: | 80 parts by weight |
| methyl isobutyl ketone: | 80 parts by weight |
| toluene: | 80 parts by weight |

The magnetic paint of the upper layer having the above-described composition was kneaded by three rolls and then dispersed by using a sand mill. Then, polyisocyanate of 4 parts by weight and myristic acid of 1 parts by weight were added to the obtained magnetic paint. The obtained magnetic paint was filtered by a filter having an average aperture of 1 μm to obtain upper layer magnetic paint solution.

| <Production of paint of lower magnetic layer> | |
|---|---|
| magnetic metal powder: | 100 parts by weight |
| average length of major axis: | 0.25 μm |
| specific surface area: | 60 m$^2$/g by BET method |
| coercive force Hc: | 120 (kA/m) |
| saturation magnetization σs: | 110 (Am$^2$/kg) |
| vinyl chloride copolymer: | 15 parts by weight |
| (produced by Nippon Zeon Co., Ltd. trade name: MR-110) | |
| polyester polyurethane resin: | 5 parts by weight |
| (isophthalic acid/terephthalic acid/ neopentyl glycol-MDI polyurethane; molecular weight of 25000, polar group = SO$_3$Na of 0.2 wt %) | |

| <Production of paint of lower magnetic layer> | |
|---|---|
| abrasive: | variable |
| (The detail is described in Table 5 shown below.) | |
| carbon black: | variable |
| (The detail is described in Table 5 shown below.) | |
| polyisocyanate: | 4 parts by weight |
| (produced by Nippon Polyurethane Industry Co., Ltd., trade name: Coronate L, in this case, polyisocyanate was mixed immediately before application.) | |
| myristic acid: | 1 parts by weight |
| butyl stearate: | 1 parts by weight |
| methyl ethyl ketone: | 80 parts by weight |
| methyl isobutyl ketone: | 80 parts by weight |
| toluene: | 80 parts by weight |

The magnetic paint of the lower layer having the above-described composition was kneaded by a continuous kneader and then dispersed by using a sand mill. Then, polyisocyanate of 4 parts by weight and myristic acid of 1 parts by weight were added to the obtained magnetic paint. The obtained magnetic paint was filtered by a filter having an average aperture of 1 μm to obtain lower layer, magnetic paint solution.

Further, back coat paint having a below-described composition was prepared.

| <Production of non-magnetic paint for back coat> | |
|---|---|
| carbon black: | 100 parts by weight |
| (average particle size of 20 nm) | |
| carbon black: | 5 parts by weight |
| (average particle size of 350 nm) | |
| polyurethane resin: | 25 parts by weight |
| (including polycarbonate polyol/neopentyl glycol HDI polyurethane; molecular weight of 35000, N-methyl diethanol amine of 0.2 wt %) | |
| nitrocellulose: | 15 parts by weight |
| (produced by Asahi Kasei Corporation, trade name: NC-1/2H) | |
| polyisocyanate: | 20 parts by weight |
| (produced by Nippon Polyurethane Industry Co., Ltd., trade name: Coronate L. In this case, polyisocyanate was mixed immediately before the application of paint.) | |
| methyl ethyl ketone: | 180 parts by weight |
| methyl isobutyl ketone: | 180 parts by weight |
| toluene: | 180 parts by weight |

The non-magnetic paint having the above-described composition was kneaded by three rolls and then dispersed by using a sand mill. Then, polyisocyanate of 20 parts by weight was added to the obtained non-magnetic paint. The obtained non-magnetic paint was filtered by a filter having an average aperture of 1 μm to obtain non-magnetic paint solution for the back coat.

The magnetic paint solutions prepared as described above were respectively applied to a polyethylene terephthalate film having the thickness of 10 μm so as to respectively have the thickness of the upper and lower layers shown in the Table 5. Thus, the magnetic paints were applied to the two magnetic layers at the same time, dried, calendered and cured. Then, the non-magnetic paint for the back coat prepared as described above was applied to a surface opposite to the magnetic surface of the polyethylene terephthalate film so as to have the thickness of 0.8 μm, and dried. Then, the obtained wide magnetic film was cut to a film having ½ inch-width so that a video tape was formed. Further, the video tape was incorporated in a cassette for HDCAM produced by Sony Corporation. Then, cassette tapes of Examples 36 to 74 and Comparative Examples 30 to 35 were manufactured.

<Measurement Method>

(Measurement of Electromagnetic Transfer Characteristics)

For each of the above-described Samples incorporated in the HDCAM cassettes, an output of a digital video signal under 46.98 MHz and an analog audio signal under 1 kHz on an HDCAM video tape recorder (HDW-500) produced by SONY Corporation was measured. The value of the Example 36 was represented as 0 dB.

In the measurement of the electromagnetic transfer characteristics, the samples having the outputs of −0.5 dB or lower may be decided to be inferior in their characteristics to the tape as a reference. The samples having the outputs of −2.0 dB or lower may be decided not to satisfy standards of various kinds of formats.

(Measurement of Still Durability)

The Samples incorporated in the HDCAM cassettes were respectively made to run on the HDCAM video tape recorder (HDW-500) produced by SONY Corporation for 100 minutes in a still mode under an environment of 5° C. and RH of 15% to visually observe the surfaces and the edge parts of the tapes, and evaluate them in accordance with the following standards.

◯ shows tapes completely running for 100 minutes and having no damage on their tape edges. Δ shows tapes completely running for 100 minutes, but having the generation of errors in channel conditions. x shows tapes that do not completely run for 100 minutes.

(Measurement of Durability)

Recording and reproducing operations were carried out by an HDCAM video recorder (HDW-2000) produced by SONY Corporation for 100 hours to measure the waveforms of the outputs of video signals and evaluate them in accordance with the following standards.

◯ shows that an output of a video signal is not deteriorated. Δ shows that an output is deteriorated, but an output is recovered or an output is located within a range of −2.0 dB. x shows that a clogging of a head is generated.

(Measurement of Wear of Head)

Recording and reproducing operations were carried out by a digital beta cam video recorder (DVW-500) produced by SONY Corporation for 100 hours to measure an average value of the decrease of protrusion of a head.

Then, for an initial protrusion, the head of about 33 μm was used and the evaluation of wear of the head was carried out in accordance with the following standards.

◯ shows tapes having the abrasion loss of the head of 1 μm or smaller after running for 100 hours. Δ shows tapes having the abrasion loss of the head of 1 μm or larger and 1.5 μm or smaller after running for 100 hours. x shows tapes having the abrasion loss of the head of 1.5 μm or larger after running for 100 hours.

The tapes having the wear of the head of 1.5 μm or larger after 100 hours cannot satisfy a time ensured by a maker until the head is replaced by a new head, so that these tapes are not good.

(Measurement of Electric Resistance)

DC 100V was applied to the magnetic surface of ½ inch-tapes to measure electric resistances by a super-insulation resistance tester. When the electric resistance is $5\times10^{12}$ or higher, the electric resistance is too high, static electricity may be apt to be produced in the tapes and the tapes may stick to a VTR travel system under low temperature and low humidity. Thus, such tapes are not good in practice.

Measurement results are shown in Tables 5 to 7.

TABLE 5

| | Composition of binding agent of upper magnetic layer | | | | | Composition of binding agent of lower magnetic layer | | | | |
|---|---|---|---|---|---|---|---|---|---|---|
| | CB Particle size (nm) | Amount of addition Parts by weight | Abrasive Particle size (nm) | Amount of addition Parts by weight | Thickness (μm) | CB Particle size (nm) | Amount of addition Parts by weight | Abrasive Particle size (nm) | Amount of addition Parts by weight | Thickness (μm) |
| Example 36 | A (250) | 1 | c (0.25) | 5 | 0.5 | I (18) | 3 | c (0.25) | 5 | 2.5 |
| Example 37 | A (250) | 1 | c (0.25) | 5 | 0.5 | II (20) | 3 | c (0.25) | 5 | 2.5 |
| Example 38 | A (250) | 1 | c (0.25) | 5 | 0.5 | III (23) | 3 | c (0.25) | 5 | 2.5 |
| Example 39 | A (250) | 1 | c (0.25) | 5 | 0.5 | IV (23) | 3 | c (0.25) | 5 | 2.5 |
| Example 40 | A (250) | 1 | c (0.25) | 5 | 0.5 | V (24) | 3 | c (0.25) | 5 | 2.5 |
| Example 41 | A (250) | 1 | c (0.25) | 5 | 0.5 | VI (78) | 3 | c (0.25) | 5 | 2.5 |
| Example 42 | A (250) | 1 | c (0.25) | 5 | 0.5 | VII (80) | 3 | c (0.25) | 5 | 2.5 |
| Example 43 | A (250) | 1 | c (0.25) | 5 | 0.5 | VIII (85) | 3 | c (0.25) | 5 | 2.5 |
| Comparative Example 30 | A (250) | 1 | c (0.25) | 5 | 0.5 | none | | c (0.25) | 5 | 2.5 |
| Comparative Example 31 | A (250) | 1 | c (0.25) | 5 | 0.5 | I (18) | 3 | none | | 2.5 |
| Comparative Example 32 | none | | c (0.25) | 5 | 0.5 | I (18) | 3 | c (0.25) | 5 | 2.5 |
| Comparative Example 33 | A (250) | 1 | none | | 0.5 | I (18) | 3 | c (0.25) | 5 | 2.5 |
| Comparative Example 34 | A (250) | 1 | c (0.25) | 5 | 3 | having no lower layer (single upper layer) | | | | |
| Comparative Example 35 | having no upper layer (single lower layer) | | | | | I (18) | 3 | c (0.25) | 5 | 3 |

TABLE 5-continued

| | | Tape characteristics | | | | | | Electric resistance ($\Omega$) |
|---|---|---|---|---|---|---|---|---|
| | | Video electromagnetic transfer characteristics | | Sensitivity | | | | |
| | | 46.98 MHz | C/N | 1 kHz | Still | Durability | Head wear | |
| | Example 36 | +0.0 | +0.0 | +0.0 | ○ | ○ | ○ | 2.5E+10 |
| | Example 37 | +0.0 | +0.0 | +0.0 | ○ | ○ | ○ | 5.0E+09 |
| | Example 38 | +0.0 | +0.0 | +0.0 | ○ | ○ | ○ | 2.5E+10 |
| | Example 39 | +0.0 | +0.0 | +0.0 | ○ | ○ | ○ | 2.1E+10 |
| | Example 40 | +0.0 | +0.0 | +0.0 | ○ | ○ | ○ | 3.0E+10 |
| | Example 41 | +0.0 | +0.0 | +0.0 | ○ | ○ | ○ | 5.1E+10 |
| | Example 42 | −0.1 | +0.0 | −0.1 | ○ | ○ | ○ | 6.0E+10 |
| | Example 43 | −0.2 | −0.1 | −0.2 | ○ | ○ | ○ | 9.0E+10 |
| | Comparative Example 30 | +0.0 | +0.0 | +1.2 | Δ | ○ | ○ | 6.5E+12 |
| | Comparative Example 31 | +0.0 | +0.0 | +1.0 | X | ○ | ○ | 3.2E+10 |
| | Comparative Example 32 | +0.8 | +0.4 | +0.0 | X | ○ | ○ | 1.2E+11 |
| | Comparative Example 33 | cannot be measured | | | X | X | — | 7.0E+10 |
| | Comparative Example 34 | +0.0 | +0.0 | −1.0 | ○ | ○ | ○ | 2.2E+10 |
| | Comparative Example 35 | −2.0 | −1.0 | +1.0 | Δ | Δ | ○ | 5.2E+10 |

Carbon having large particle size
A Thermal Carbon Black N990 (produced by U.S. Engineered Carbons Inc., particle size of 250 nm)
B Cancarb MT (produced by Canada Cancarb Ltd., average particle size of 280 nm)
C Sevacarb MT-CI (produced by Colombian Carbon Corporation, particle size of 300 nm)
D Sevacarb MT (produced by Colombian Carbon Corporation, particle size of 350 nm)
Abrasive
a HIT-80 (produced by Sumitomo Chemical Co., Ltd., α-alumina, average particle size of 0.1 μm, Mohs scale of 9)
b HIT-60A (produced by Sumitomo Chemical Co., Ltd., α-alumina, average particle size of 0.2 μm, Mohs scale of 9)
c HIT-50 (produced by Sumitomo Chemical Co., Ltd., α-alumina, average particle size of 0.25 μm, Mohs scale of 9)
d AKP-30 (produced by Sumitomo Chemical Co., Ltd., α-alumina, average particle size of 0.4 μm, Mohs scale of 9)
e AKP-20 (produced by Sumitomo Chemical Co., Ltd., α-alumina, average particle size of 0.5 μm, Mohs scale of 9)
f AKP-15 (produced by Sumitomo Chemical Co., Ltd., α-alumina, average particle size of 0.7 μm, Mohs scale of 9)
g KR-380 (produced by Titan Kogyo K. K., rutile type titanium oxide, average particle size of 0.38 μm, Mohs scale of 6)
h KA-10 (produced by Titan Kogyo K. K., anatase type titanium oxide, average particle size of 0.39 μm, Mohs scale of 6)
Carbon having small particle size
I 9H SAF-HS (produced by Tokai Carbon Co., Ltd., particle size of 18 nm, BET value of 142 $m^2$/kg, DBP oil absorption of 130 ml/100 g)
II SC (produced by CONDUCTEX Corporation, particle size of 20 nm, BET value of 220.0 $m^2$/g, DBP oil absorption of 115.0 ml/100 g)
III RAVEN 1255 (produced by Colombian Carbon Corporation, particle size of 23 nm, BET value of 125.0 $m^2$/g, DBP oil absorption of 58.0 ml/100 g)
IV BLACK PEARLS L (produced by Cabot Corporation, particle size of 24 nm, BET value of 250.0 $m^2$/g, DBP oil absorption of 60.0 ml/100 g)
V #80 (produced by Asahi Carbon Co. Ltd., particle size of 23 nm, BET value of 117.0 $m^2$/g, DBP oil absorption of 113.0 ml/100 g)
VI #35 (produced by Asahi Carbon Co. Ltd., particle size of 78 nm, BET value of 24 $m^2$/g, DBP oil absorption of 50 ml/100 g)
VII #50 (produced by Asahi Carbon Co. Ltd., particle size of 80 nm, BET value of 23 $m^2$/g, DBP oil absorption of 63 ml/100 g)
VIII #50H (produced by Asahi Carbon Co. Ltd., particle size of 85 nm, BET value of 20 $m^2$/g, DBP oil absorption of 80 ml/100 g)

TABLE 6

| | Composition of binding agent of upper magnetic layer | | | | | Composition of binding agent of lower magnetic layer | | | | |
|---|---|---|---|---|---|---|---|---|---|---|
| | CB Particle size (nm) | Amount of addition Parts by weight | Abrasive Particle size (nm) | Amount of addition Parts by weight | Thickness (μm) | CB Particle size (nm) | Amount of addition Parts by weight | Abrasive Particle size (nm) | Amount of addition Parts by weight | Thickness (μm) |
| Example 44 | B (280) | 1 | c (0.25) | 5 | 0.5 | I (18) | 3 | c (0.25) | 5 | 2.5 |
| Example 45 | B (280) | 1 | c (0.25) | 5 | 0.5 | II (20) | 3 | c (0.25) | 5 | 2.5 |
| Example 46 | B (280) | 1 | c (0.25) | 5 | 0.5 | III (23) | 3 | c (0.25) | 5 | 2.5 |
| Example 47 | C (300) | 1 | c (0.25) | 5 | 0.5 | IV (23) | 3 | c (0.25) | 5 | 2.5 |
| Example 48 | C (300) | 1 | c (0.25) | 5 | 0.5 | V (24) | 3 | c (0.25) | 5 | 2.5 |
| Example 49 | C (300) | 1 | c (0.25) | 5 | 0.5 | VI (78) | 3 | c (0.25) | 5 | 2.5 |
| Example 50 | D (350) | 1 | c (0.25) | 5 | 0.5 | VII (80) | 3 | c (0.25) | 5 | 2.5 |
| Example 51 | D (350) | 1 | c (0.25) | 5 | 0.5 | VIII (85) | 3 | c (0.25) | 5 | 2.5 |
| Example 52 | B (280) | 0.5 | c (0.25) | 5 | 0.5 | IV (23) | 3 | c (0.25) | 5 | 2.5 |
| Example 53 | B (280) | 2 | c (0.25) | 5 | 0.5 | IV (23) | 3 | c (0.25) | 5 | 2.5 |
| Example 54 | B (280) | 2 | a (0.1) | 5 | 0.5 | IV (23) | 3 | c (0.25) | 5 | 2.5 |
| Example 55 | B (280) | 2 | b (0.2) | 5 | 0.5 | IV (23) | 3 | c (0.25) | 5 | 2.5 |
| Example 56 | B (280) | 2 | d (0.4) | 5 | 0.5 | IV (23) | 3 | c (0.25) | 5 | 2.5 |

TABLE 6-continued

| | | | | | | | | | | |
|---|---|---|---|---|---|---|---|---|---|---|
| Example 57 | B (280) | 2 | e (0.5) | 5 | 0.5 | IV (23) | 3 | c (0.25) | 5 | 2.5 |
| Example 58 | B (280) | 2 | f (0.7) | 5 | 0.5 | IV (23) | 3 | c (0.25) | 5 | 2.5 |
| Example 59 | B (280) | 2 | c (0.25) | 5 | 0.5 | IV (23) | 3 | a (0.1) | 5 | 2.5 |
| Example 60 | B (280) | 2 | c (0.25) | 5 | 0.5 | IV (23) | 3 | b (0.2) | 5 | 2.5 |
| Example 61 | B (280) | 2 | c (0.25) | 5 | 0.5 | IV (23) | 3 | d (0.4) | 5 | 2.5 |
| Example 62 | B (280) | 2 | c (0.25) | 5 | 0.5 | IV (23) | 3 | e (0.5) | 5 | 2.5 |
| Example 63 | B (280) | 2 | c (0.25) | 5 | 0.5 | IV (23) | 3 | f (0.7) | 5 | 2.5 |

| | Tape characteristics | | | | | | |
|---|---|---|---|---|---|---|---|
| | Video electromagnetic transfer characteristics | | Sensitivity | | | | Electric resistance |
| | 46.98 MHz | C/N | 1 kHz | Still | Durability | Head wear | ($\Omega$) |
| Example 44 | −0.1 | −0.1 | −0.1 | ◯ | ◯ | ◯ | 2.2E+10 |
| Example 45 | +0.0 | +0.0 | +0.0 | ◯ | ◯ | ◯ | 4.0E+09 |
| Example 46 | +0.0 | +0.0 | +0.0 | ◯ | ◯ | ◯ | 2.4E+10 |
| Example 47 | +0.0 | +0.0 | +0.0 | ◯ | ◯ | ◯ | 1.8E+10 |
| Example 48 | +0.0 | +0.0 | +0.0 | ◯ | ◯ | ◯ | 2.8E+10 |
| Example 49 | −0.1 | +0.0 | +0.0 | ◯ | ◯ | ◯ | 4.7E+10 |
| Example 50 | −0.2 | −0.1 | +0.0 | ◯ | ◯ | ◯ | 5.7E+10 |
| Example 51 | −0.3 | −0.2 | −0.3 | ◯ | ◯ | ◯ | 8.8E+10 |
| Example 52 | +0.5 | +0.2 | +0.1 | ◯ | ◯ | ◯ | 6.2E+10 |
| Example 53 | −0.5 | +0.3 | +0.0 | ◯ | ◯ | ◯ | 2.1E+09 |
| Example 54 | +0.3 | +0.1 | +0.0 | ◯ | Δ | ◯ | 2.2E+10 |
| Example 55 | +0.1 | +0.0 | +0.0 | ◯ | Δ | ◯ | 4.0E+09 |
| Example 56 | +0.0 | +0.0 | +0.0 | ◯ | ◯ | ◯ | 3.4E+10 |
| Example 57 | −0.1 | +0.0 | +0.0 | ◯ | ◯ | ◯ | 3.6E+10 |
| Example 58 | −0.4 | −0.2 | +0.0 | ◯ | ◯ | Δ | 3.5E+10 |
| Example 59 | +0.2 | +0.0 | +0.0 | ◯ | ◯ | ◯ | 4.1E+10 |
| Example 60 | +0.1 | +0.0 | +0.0 | ◯ | ◯ | ◯ | 2.2E+10 |
| Example 61 | +0.0 | +0.0 | +0.0 | ◯ | ◯ | ◯ | 4.0E+09 |
| Example 62 | −0.1 | +0.0 | +0.0 | ◯ | ◯ | ◯ | 3.4E+10 |
| Example 63 | −0.1 | −0.1 | −0.2 | ◯ | ◯ | ◯ | 3.6E+10 |

Carbon having large particle size
A Thermal Carbon Black N990 (produced by U.S. Engineered Carbons Inc., particle size of 250 nm)
B Cancarb MT (produced by Canada Cancarb Ltd., average particle size of 280 nm)
C Sevacarb MT-CI (produced by Colombian Carbon Corporation, particle size of 300 nm)
D Sevacarb MT (produced by Colombian Carbon Corporation, particle size of 350 nm)
Abrasive
a HIT-80 (produced by Sumitomo Chemical Co., Ltd., α-alumina, average particle size of 0.1 μm, Mohs scale of 9)
b HIT-60A (produced by Sumitomo Chemical Co., Ltd., α-alumina, average particle size of 0.2 μm, Mohs scale of 9)
c HIT-50 (produced by Sumitomo Chemical Co., Ltd., α-alumina, average particle size of 0.25 μm, Mohs scale of 9)
d AKP-30 (produced by Sumitomo Chemical Co., Ltd., α-alumina, average particle size of 0.4 μm, Mohs scale of 9)
e AKP-20 (produced by Sumitomo Chemical Co., Ltd., α-alumina, average particle size of 0.5 μm, Mohs scale of 9)
f AKP-15 (produced by Sumitomo Chemical Co., Ltd., α-alumina, average particle size of 0.7 μm, Mohs scale of 9)
g KR-380 (produced by Titan Kogyo K. K., rutile type titanium oxide, average particle size of 0.38 μm, Mohs scale of 6)
h KA-10 (produced by Titan Kogyo K. K., anatase type titanium oxide, average particle size of 0.39 μm, Mohs scale of 6)
Carbon having small particle size
I 9H SAF-HS (produced by Tokal Carbon Co., Ltd., particle size of 18 nm, BET value of 142 m$^2$/kg, DBP oil absorption of 130 ml/100 g)
II SC (produced by CONDUCTEX Corporation, particle size of 20 nm, BET value of 220.0 m$^2$/g, DBP oil absorption of 115.0 ml/100 g)
III RAVEN 1255 (produced by Colombian Carbon Corporation, particle size of 23 nm, BET value of 125.0 m$^2$/g, DBP oil absorption of 58.0 ml/100 g)
IV BLACK PEARLS L (produced by Cabot Corporation, particle size of 24 nm, BET value of 250.0 m$^2$/g, DBP oil absorption of 60.0 ml/100 g)
V #80 (produced by Asahi Carbon Co. Ltd., particle size of 23 nm, BET value of 117.0 m$^2$/g, DBP oil absorption of 113.0 ml/100 g)
VI #35 (produced by Asahi Carbon Co. Ltd., particle size of 78 nm, BET value of 24 m$^2$/g, DBP oil absorption of 50 ml/100 g)
VII #50 (produced by Asahi Carbon Co. Ltd., particle size of 80 nm, BET value of 23 m$^2$/g, DBP oil absorption of 63 ml/100 g)
VIII #50H (produced by Asahi Carbon Co. Ltd., particle size of 85 nm, BET value of 20 m$^2$/g, DBP oil absorption of 80 ml/100 g)

TABLE 7

| | Composition of binding agent of upper magnetic layer | | | | | Composition of binding agent of lower magnetic layer | | | | |
|---|---|---|---|---|---|---|---|---|---|---|
| | CB Particle size (nm) | Amount of addition Parts by weight | Abrasive Particle size (nm) | Amount of addition Parts by weight | Thickness (μm) | CB Particle size (nm) | Amount of addition Parts by weight | Abrasive Particle size (nm) | Amount of addition Parts by weight | Thickness (μm) |
| Example 64 | B (280) | 1 | c (0.25) | 5 | 0.1 | IV (23) | 3 | c (0.25) | 5 | 2.9 |
| Example 65 | B (280) | 1 | c (0.25) | 5 | 0.2 | IV (23) | 3 | c (0.25) | 5 | 2.8 |
| Example 66 | B (280) | 1 | c (0.25) | 5 | 0.3 | IV (23) | 3 | c (0.25) | 5 | 2.7 |
| Example 67 | B (280) | 1 | c (0.25) | 5 | 1.0 | IV (23) | 3 | c (0.25) | 5 | 2.0 |
| Example 68 | B (280) | 1 | c (0.25) | 5 | 1.5 | IV (23) | 3 | c (0.25) | 5 | 1.5 |

TABLE 7-continued

| | | | | | | | | | | |
|---|---|---|---|---|---|---|---|---|---|---|
| Example 69 | B (280) | 1 | g (0.38) | 5 | 0.5 | IV (23) | 3 | c (0.25) | 5 | 2.5 |
| Example 70 | B (280) | 1 | h (0.39) | 5 | 0.5 | IV (23) | 3 | c (0.25) | 5 | 2.5 |
| Example 71 | B (280) | 1 | c (0.25) | 5 | 0.5 | IV (23) | 3 | g (0.38) | 5 | 2.5 |
| Example 72 | B (280) | 1 | c (0.25) | 5 | 0.5 | IV (23) | 3 | h (0.39) | 5 | 2.5 |
| Example 73 | B (280) | 1 | g (0.38) | 5 | 0.5 | IV (23) | 3 | g (0.38) | 5 | 2.5 |
| Example 74 | B (280) | 1 | h (0.39) | 5 | 0.5 | IV (23) | 3 | h (0.39) | 5 | 2.5 |

| | Tape characteristics | | | | | |
|---|---|---|---|---|---|---|
| | Video electromagnetic transfer characteristics | Sensitivity | | | | Electric resistance |
| | 46.98 MHz | C/N | 1 kHz | Still | Durability | Head wear | ($\Omega$) |
| Example 64 | −0.1 | −0.3 | +0.0 | ○ | ○ | ○ | 3.3E+10 |
| Example 65 | +0.7 | +0.2 | +0.0 | ○ | ○ | ○ | 3.4E+10 |
| Example 66 | +0.5 | +0.2 | +0.0 | ○ | ○ | ○ | 3.1E+10 |
| Example 67 | +0.0 | +0.0 | −0.1 | ○ | ○ | ○ | 2.9E+10 |
| Example 68 | +0.0 | −0.1 | −0.3 | ○ | ○ | ○ | 2.1E+10 |
| Example 69 | +0.0 | −0.1 | +0.0 | ○ | ○ | ○ | 3.0E+10 |
| Example 70 | −0.2 | +0.0 | +0.0 | ○ | ○ | ○ | 4.0E+10 |
| Example 71 | +0.0 | +0.0 | −0.1 | ○ | ○ | ○ | 3.0E+09 |
| Example 72 | +0.0 | +0.0 | −0.1 | ○ | ○ | ○ | 2.4E+09 |
| Example 73 | +0.0 | −0.1 | −0.2 | ○ | ○ | ○ | 2.0E+09 |
| Example 74 | −0.1 | −0.1 | −0.1 | ○ | ○ | ○ | 2.0E+09 |

Carbon having large particle size
A Thermal Carbon Black N990 (produced by U.S. Engineered Carbons Inc., particle size of 250 nm)
B Cancarb MT (produced by Canada Cancarb Ltd., average particle size of 280 nm)
C Sevacarb MT-CI (produced by Colombian Carbon Corporation, particle size of 300 nm)
D Sevacarb MT (produced by Colombian Carbon Corporation, particle size of 350 nm)
Abrasive
a HIT-80 (produced by Sumitomo Chemical Co., Ltd., α-alumina, average particle size of 0.1 μm, Mohs scale of 9)
b HIT-60A (produced by Sumitomo Chemical Co., Ltd., α-alumina, average particle size of 0.2 μm, Mohs scale of 9)
c HIT-50 (produced by Sumitomo Chemical Co., Ltd., α-alumina, average particle size of 0.25 μm, Mohs scale of 9)
d AKP-30 (produced by Sumitomo Chemical Co., Ltd., α-alumina, average particle size of 0.4 μm, Mohs scale of 9)
e AKP-20 (produced by Sumitomo Chemical Co., Ltd., α-alumina, average particle size of 0.5 μm, Mohs scale of 9)
f AKP-15 (produced by Sumitomo Chemical Co., Ltd., α-alumina, average particle size of 0.7 μm, Mohs scale of 9)
g KR-380 (produced by Titan Kogyo K. K., rutile type titanium oxide, average particle size of 0.38 μm, Mohs scale of 6)
h KA-10 (produced by Titan Kogyo K. K., anatase type titanium oxide, average particle size of 0.39 μm, Mohs scale of 6)
Carbon having small particle size
I 9H SAF-HS (produced by Tokai Carbon Co., Ltd., particle size of 18 nm, BET value of 142 $m^2$/kg, DBP oil absorption of 130 ml/100 g)
II SC (produced by CONDUCTEX Corporation, particle size of 20 nm, BET value of 220.0 $m^2$/g, DBP oil absorption of 115.0 ml/100 g)
III RAVEN 1255 (produced by Colombian Carbon Corporation, particle size of 23 nm, BET value of 125.0 $m^2$/g, DBP oil absorption of 58.0 ml/100 g)
IV BLACK PEARLS L (produced by Cabot Corporation, particle size of 24 nm, BET value of 250.0 $m^2$/g, DBP oil absorption of 60.0 ml/100 g)
V #80 (produced by Asahi Carbon Co. Ltd., particle size of 23 nm, BET value of 117.0 $m^2$/g, DBP oil absorption of 113.0 ml/100 g)
VI #35 (produced by Asahi Carbon Co. Ltd., particle size of 78 nm, BET value of 24 $m^2$/g, DBP oil absorption of 50 ml/100 g)
VII #50 (produced by Asahi Carbon Co. Ltd., particle size of 80 nm, BET value of 23 $m^2$/g, DBP oil absorption of 63 ml/100 g)
VIII #50H (produced by Asahi Carbon Co. Ltd., particle size of 85 nm, BET value of 20 $m^2$/g, DBP oil absorption of 80 ml/100 g)

The Comparative Example 30 shows an example in which carbon black is not included in the lower magnetic layer. In this case, the electric resistance is too high and there exists a problem of sticking, so that it is apparently recognized that this Sample is not applicable to a practical use.

Further, the Comparative Example 31 shows an example in which the abrasive is not included in the lower magnetic layer. In this case, powder drops due to detachment of the magnetic layer from the edge part (end face) of the tape so that a still durability is not good.

The Comparative Example 32 shows an example in which MT carbon is not included in the upper magnetic layer and carbon having a large particle size that forms large protrusions on the surface is not included. Thus, a friction under a still running is increased to increase an error rate.

The Comparative Example 33 shows an example in which the abrasive is not included in the upper magnetic layer. In this case, a clogging of a head is generated in such a short time as to measure he electromagnetic transfer characteristics. Thus, this Sample cannot be used as a tape.

The Comparative Example 34 is an example in which a magnetic paint is applied only to a single layer of the upper magnetic layer so as to have the thickness of 3 μm. In this case, digital video characteristics are satisfied, however, the output of an analog audio sensitivity (1K) is low. Thus, this Sample is hardly used for an analog VTR format.

The Comparative Example 35 shows an example in which a magnetic paint is applied only to a single layer of the lower magnetic layer so as to have the thickness of 3 μm. In this case, the digital video characteristics are not satisfied, conversely to the Comparative Example 34, and the durability is apparently bad.

As compared therewith, the Examples 36 to 43 follow the composition of the present invention. The above-described Examples show results that especially the particle size of carbon in the lower magnetic layer is changed. All of them obtain results better than those of the Comparative Examples and support the present invention. When the particle size of the carbon black in the lower magnetic layer is 80 nm or larger, the analog audio characteristics obviously tend to be deteriorated. Therefore, the particle size of the carbon black included in the lower magnetic layer is desirably not larger than 80 nm.

The Examples 44 to 51 of the Table 6 show results that various kinds of carbon black are combined. All of them show such results as to support the present invention.

The Example 52 shows an example in which the amount of addition of MT carbon to the upper magnetic layer is 0.5 parts by weight. In this case, the amount of carbon having a large particle size is decreased, so that the loss of the electromagnetic transfer characteristics due to spacing between the head and the tape is decreased. Thus, the video characteristics are improved.

The Example 53 shows an example in which the amount of addition of MT carbon to the upper magnetic layer is 2 parts by weight. In this case, the amount of carbon having a large particle size is increased, so that the loss of the electromagnetic transfer characteristics due to the spacing is apparently increased.

The Examples 54 to 58 show results that the relation between the thickness of the upper magnetic layer and the particle size of the abrasive is recognized. As apparent from the results, when the abrasive having a particle size half or less as large as the thickness of the upper layer is used, the still durability tends to be deteriorated like the Examples 54 and 55. On the other hand, when the abrasive having a particle size larger than the thickness of the upper layer, the head wear is increased as shown in the Example 58. As apparent from the above, the particle size of the abrasive of the upper layer desirably ranges from the size half as large as the thickness of the upper layer to the size the same as the thickness of the upper layer.

The Examples 59 to 63 show examples in which the particle size of the abrasive included in the lower magnetic layer is changed. For the lower magnetic layer, any of the abrasives may be apparently employed with good results.

The Examples 64 to 68 shown in the Table 7 show results that the thickness of the upper layer is changed. When the thickness of the upper layer is 0.1 µm as in the Example 64, the roughness of the magnetic layer is apt to be increased due to the influence of the ground of the surface of the lower layer. This tendency is estimated owing to unevenness in the interface between the upper layer and the lower layer. Further, when the upper layer is thick as large as 1.5 µm as in the Example 68, characteristics come near to those of the single upper layer, so that the audio characteristics are liable to be deteriorated. From these results, it is apparent that the thickness of the upper layer is more effectively located within a range of 0.2 to 1.0 µm.

The Examples 69 to 74 show examples in which titanium oxide having Mohs scale of 6 is used. The Examples 69 and 70 in which titanium oxide is used only for the upper layer, the Examples 71 and 72 in which titanium oxide is used only for the lower layer, and the Examples 73 and 74 in which titanium oxide is used in both the upper layer and the lower layer respectively obtain good results. Among them, titanium oxide having a rutile type crystal structure obviously has more effective results as well as still durability.

What is claimed is:

1. A magnetic recording medium comprising:
    a non-magnetic supporter;
    a first magnetic layer formed above said non-magnetic supporter and formed from a magnetic paint having a first ferromagnetic material; and
    a second magnetic layer formed above said first magnetic layer and formed from a magnetic paint having a second ferromagnetic material, wherein the first magnetic layer and the second magnetic layer include polyester polyol having an alicyclic framework and a polyurethane resin composed of diisocyanate and wherein a concentration of a urethane group in the polyurethane resin ranges from 0.5 mmol/g to 3.0 mmol/g, the first magnetic layer having a thickness approximately five times greater than a thickness of the second magnetic layer and wherein a combined thickness of said first and second magnetic layers is approximately 3.0 µm and further wherein at least one of the first and second magnetic layers includes alkali metal sulfonate incorporated into the resin at concentration of 0.001 mmol per gram to 1.0 mmol per gram, wherein a urethane group concentration for the first magnetic layer and the second magnetic layer is substantially the same, and wherein the first and second magnetic layers are deposited via a Wet-on-Wet method.

2. The magnetic recording medium according to claim 1, wherein the magnetic paints are formed from a powder and wherein a content of the polyurethane resin has a mixing ratio relative to the weight of magnetic powder, said mixing ratio being the same in the first magnetic layer and the second magnetic layer.

3. The magnetic recording medium according to claim 2, wherein tertiary amine is included in the polyurethane resin.

4. The magnetic recording medium according to claim 1, wherein tertiary amine is included in the polyurethane resin.

5. The magnetic recording medium of claim 1, wherein the magnetic paints used to form said first magnetic layer and said second magnetic layer are formed from magnetic powders and wherein the quantity of polyurethane resin ranges from five parts by weight to twenty parts by weight relative to the weight of the magnetic powder.

6. The magnetic recording medium of claim 5, further wherein the alkali metal sulfonate is incorporated into the resin at concentration of 0.01 mmol per gram to 0.4 mmol per gram.

7. The magnetic recording medium of claim 6, further comprising a quantity of a polar group of a tertiary amine present in a range of 0.01 mmol/g to 0.5 mmol/g.

8. The magnetic recording medium of claim 5, further comprising a quantity of a polar group of a tertiary amine present in a range of 0.01 mmol/g to 0.5 mmol/g.

9. The magnetic recording medium of claim 1, further wherein the alkali metal sulfonate is incorporated into the resin at concentration of 0.01 mmol per gram to 0.4 mmol per gram.

10. The magnetic recording medium of claim 9, further comprising a quantity of a polar group of a tertiary amine present in a range of 0.01 mmol/g to 0.5 mmol/g.

11. The magnetic recording medium of claim 1, further comprising a quantity of a polar group of a tertiary amine present in a range of 0.01 mmol/g to 0.5 mmol/g.

12. The magnetic recording medium of claim 1, further wherein the alkali metal sulfonate is incorporated into the first and second magnetic layers.

* * * * *